US011763067B2

(12) United States Patent
Glasgow et al.

(10) Patent No.: US 11,763,067 B2
(45) Date of Patent: Sep. 19, 2023

(54) USER INTERFACE FOR EDITING WEB CONTENT

(71) Applicant: Block, Inc., San Francisco, CA (US)

(72) Inventors: Ryan J. Glasgow, San Francisco, CA (US); Vitaly Odemchuk, San Francisco, CA (US); Benjamin A. Bloch, San Francisco, CA (US); Daniel Veltri, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 16/405,953

(22) Filed: May 7, 2019

(65) Prior Publication Data
US 2019/0265866 A1    Aug. 29, 2019

Related U.S. Application Data

(63) Continuation of application No. 16/200,354, filed on Nov. 26, 2018, which is a continuation of application
(Continued)

(51) Int. Cl.
*G06F 17/00* (2019.01)
*G06F 40/143* (2020.01)
(Continued)

(52) U.S. Cl.
CPC ........ *G06F 40/143* (2020.01); *G06F 3/04842* (2013.01); *G06F 3/04847* (2013.01); *G06F 40/186* (2020.01); *G06F 2200/1614* (2013.01)

(58) Field of Classification Search
CPC ............ G06F 3/04842; G06F 3/04847; G06F 40/186; G06F 40/14; G06F 2200/1614
(Continued)

(56) References Cited

U.S. PATENT DOCUMENTS

| 4,723,211 A | 2/1988 | Barker et al. |
| 5,819,055 A | 10/1998 | MacLean et al. |

(Continued)

FOREIGN PATENT DOCUMENTS

| EP | 0 651 543 B1 | 9/2008 |
| WO | 2020/123044 A1 | 6/2020 |

OTHER PUBLICATIONS

Rivoal, F.,"Media Queries: W3C Recommendation Jun. 19, 2012," (2012), W3C, 22 pages.*

(Continued)

*Primary Examiner* — Cesar B Paula
*Assistant Examiner* — James H. Blackwell
(74) *Attorney, Agent, or Firm* — Lee & Hayes, P.C.

(57) ABSTRACT

A web editing application provides a user interface for editing a web page on a client computing device. A characteristic associated with the client computing device is determined. A web page comprising visual elements can be rendered. Layout data describing locations and sizes for individual visual elements of the visual elements can be determined. Cells can be generated based at least in part on the layout data and the characteristic associated with the client computing device. Each of the cells can have a location corresponding to a location of a respective visual element of the visual elements and individual of the cells can be interactable to enable editing of the web page. Based on an interaction with the at least one cell of the cells, an edit to the web page can be determined and the web page can be updated based on the edit to the web page.

20 Claims, 21 Drawing Sheets

Related U.S. Application Data

No. 14/878,878, filed on Oct. 8, 2015, now Pat. No. 10,139,998.

(60) Provisional application No. 62/061,691, filed on Oct. 8, 2014.

(51) Int. Cl.
  *G06F 3/04847* (2022.01)
  *G06F 3/04842* (2022.01)
  *G06F 40/186* (2020.01)

(58) Field of Classification Search
  USPC .......................................................... 715/234
  See application file for complete search history.

(56) References Cited

U.S. PATENT DOCUMENTS

| | | | |
|---|---|---|---|
| 6,212,577 B1 | 4/2001 | Stern et al. | |
| 6,304,886 B1 | 10/2001 | Bernardo et al. | |
| 7,000,184 B2* | 2/2006 | Matveyenko | G06F 40/14 715/235 |
| 7,444,597 B2* | 10/2008 | Perantatos | G06F 16/958 715/769 |
| 7,500,182 B2 | 3/2009 | Kelly | |
| 7,500,183 B2 | 3/2009 | Kelly | |
| 7,966,219 B1 | 6/2011 | Singh et al. | |
| 7,966,560 B2 | 6/2011 | Kanzaki | |
| 7,975,223 B2 | 7/2011 | Plumley et al. | |
| 8,042,040 B2 | 10/2011 | Lynton | |
| 8,125,461 B2 | 2/2012 | Weber et al. | |
| 8,166,155 B1 | 4/2012 | Rachmeler et al. | |
| 8,217,964 B2 | 7/2012 | Laine et al. | |
| 8,266,524 B2 | 9/2012 | Bailey | |
| 8,332,271 B1 | 12/2012 | Wilder et al. | |
| 8,370,219 B1 | 2/2013 | Prabhu et al. | |
| 8,397,153 B1 | 3/2013 | Lee et al. | |
| 8,438,495 B1 | 5/2013 | Gilra et al. | |
| 8,522,134 B1* | 8/2013 | Zetlen | G06F 40/117 715/234 |
| 8,555,200 B2* | 10/2013 | Hicks | G06F 16/958 715/810 |
| 8,566,704 B1* | 10/2013 | Le Bescond de Coatpont | G06F 40/14 715/234 |
| 8,671,352 B1* | 3/2014 | Hsu | G06F 3/0484 715/762 |
| 8,723,890 B2* | 5/2014 | Griffin | G06F 1/1624 345/649 |
| 8,896,632 B2 | 11/2014 | MacDougall et al. | |
| 8,904,302 B2 | 12/2014 | Higgins et al. | |
| 9,021,363 B2 | 4/2015 | Blake et al. | |
| 9,105,026 B1* | 8/2015 | Edwards | G06Q 20/322 |
| 9,213,460 B2 | 12/2015 | Nurse et al. | |
| 9,223,761 B2* | 12/2015 | Sukhanov | G06F 3/04847 |
| 9,311,426 B2* | 4/2016 | Stovicek | G06F 40/197 |
| 9,536,012 B2* | 1/2017 | Shore | G06F 3/0482 |
| 9,639,263 B2 | 5/2017 | Bloch et al. | |
| 9,703,457 B2* | 7/2017 | Hsu | G06F 3/0484 |
| 9,703,757 B2* | 7/2017 | Rimmer | G06F 40/103 |
| 9,720,581 B2* | 8/2017 | Baldwin | G06T 3/40 |
| 9,773,072 B2* | 9/2017 | Phillips | G06F 16/9577 |
| 9,785,307 B1 | 10/2017 | Ganesan et al. | |
| 9,817,916 B2* | 11/2017 | Flack | G06F 16/986 |
| 9,858,356 B1 | 1/2018 | Johnson et al. | |
| 9,922,013 B2* | 3/2018 | Le Bescond de Coatpont | G06F 40/14 |
| 10,026,062 B1 | 7/2018 | Sasmaz et al. | |
| 10,073,923 B2 | 9/2018 | Koren et al. | |
| 10,108,336 B2 | 10/2018 | Bloch et al. | |
| 10,139,998 B2 | 11/2018 | Glasgow et al. | |
| 10,185,703 B2* | 1/2019 | Abrahami | G06F 16/9577 |
| 10,402,064 B1 | 9/2019 | Al-Sallami et al. | |
| 10,529,008 B1 | 1/2020 | Pritchard et al. | |

| | | | |
|---|---|---|---|
| 2001/0045949 A1 | 11/2001 | Chithambaram et al. | |
| 2001/0049672 A1 | 12/2001 | Moore et al. | |
| 2002/0135621 A1 | 9/2002 | Angiulo et al. | |
| 2003/0014317 A1 | 1/2003 | Siegel et al. | |
| 2003/0121004 A1 | 6/2003 | Christensen et al. | |
| 2004/0230536 A1 | 11/2004 | Fung et al. | |
| 2005/0015722 A1 | 1/2005 | Niyogi et al. | |
| 2005/0094206 A1 | 5/2005 | Tonisson | |
| 2005/0246627 A1 | 11/2005 | Sayed | |
| 2006/0036994 A1 | 2/2006 | Englefield et al. | |
| 2006/0136822 A1* | 6/2006 | Kelly | G06F 16/958 715/234 |
| 2006/0174199 A1 | 8/2006 | Soltis et al. | |
| 2006/0212790 A1 | 9/2006 | Perantatos et al. | |
| 2006/0212806 A1* | 9/2006 | Griffin | G06F 40/117 715/206 |
| 2006/0225094 A1 | 10/2006 | Facemire et al. | |
| 2007/0101263 A1* | 5/2007 | Bedingfield | G06F 3/0485 715/205 |
| 2007/0150368 A1 | 6/2007 | Arora et al. | |
| 2007/0244811 A1 | 10/2007 | Tumminaro | |
| 2007/0294644 A1 | 12/2007 | Yost | |
| 2008/0065982 A1 | 3/2008 | Evanchik et al. | |
| 2008/0189156 A1 | 8/2008 | Voda et al. | |
| 2008/0209311 A1* | 8/2008 | Agronik | G06T 11/60 715/234 |
| 2008/0209442 A1 | 8/2008 | Setlur et al. | |
| 2008/0235578 A1* | 9/2008 | Heed | G06F 16/9577 715/269 |
| 2008/0281722 A1 | 11/2008 | Balasubramanian et al. | |
| 2008/0313049 A1 | 12/2008 | Lai et al. | |
| 2009/0007062 A1 | 1/2009 | Gilboa | |
| 2009/0055755 A1* | 2/2009 | Hicks | G06F 16/958 715/760 |
| 2009/0058821 A1 | 3/2009 | Chaudhri et al. | |
| 2009/0063312 A1 | 3/2009 | Hurst | |
| 2009/0156190 A1 | 6/2009 | Fisher | |
| 2009/0228838 A1* | 9/2009 | Ryan | G06F 8/38 715/764 |
| 2009/0282343 A1 | 11/2009 | Catlin et al. | |
| 2009/0305743 A1 | 12/2009 | Gouesbet et al. | |
| 2009/0313645 A1* | 12/2009 | Sathish | H04L 67/02 719/328 |
| 2009/0327101 A1 | 12/2009 | Sayed | |
| 2010/0037168 A1 | 2/2010 | Thayne et al. | |
| 2010/0083163 A1 | 4/2010 | Maghoul et al. | |
| 2010/0088639 A1 | 4/2010 | Yach et al. | |
| 2010/0313252 A1 | 12/2010 | Trouw | |
| 2011/0022350 A1* | 1/2011 | Chatterjee | G06F 3/0362 702/150 |
| 2011/0164056 A1* | 7/2011 | Ording | G06F 3/04886 345/649 |
| 2011/0185040 A1 | 7/2011 | Schmidt | |
| 2011/0208786 A1 | 8/2011 | Ghosh | |
| 2012/0089436 A1 | 4/2012 | Tavares et al. | |
| 2012/0102176 A1 | 4/2012 | Lee et al. | |
| 2012/0131483 A1 | 5/2012 | Archer et al. | |
| 2012/0162263 A1 | 6/2012 | Griffin et al. | |
| 2012/0185787 A1 | 7/2012 | Lisse et al. | |
| 2012/0232973 A1 | 9/2012 | Robb et al. | |
| 2012/0284104 A1 | 11/2012 | Keenan | |
| 2012/0290959 A1 | 11/2012 | Quine | |
| 2012/0296682 A1 | 11/2012 | Kumar et al. | |
| 2012/0296697 A1 | 11/2012 | Kumar | |
| 2012/0324400 A1 | 12/2012 | Caliendo, Jr. et al. | |
| 2013/0018713 A1 | 1/2013 | Kumar et al. | |
| 2013/0021377 A1 | 1/2013 | Doll | |
| 2013/0091417 A1 | 4/2013 | Cordasco | |
| 2013/0117653 A1* | 5/2013 | Sukhanov | G06F 3/04847 715/227 |
| 2013/0125045 A1* | 5/2013 | Sun | G06F 3/04883 715/788 |
| 2013/0145251 A1* | 6/2013 | Jureidini | G06F 16/986 715/234 |
| 2013/0145257 A1 | 6/2013 | Shalabi et al. | |
| 2013/0145306 A1* | 6/2013 | Shore | G06F 16/245 715/781 |
| 2013/0173402 A1 | 7/2013 | Young et al. | |

(56) References Cited

U.S. PATENT DOCUMENTS

| | | | |
|---|---|---|---|
| 2013/0198609 A1 | 8/2013 | Mokhtarzada et al. | |
| 2013/0219024 A1* | 8/2013 | Flack | H04L 67/02 |
| | | | 709/219 |
| 2013/0219263 A1* | 8/2013 | Abrahami | G06F 40/14 |
| | | | 715/234 |
| 2013/0222275 A1 | 8/2013 | Byrd et al. | |
| 2013/0227469 A1 | 8/2013 | Park | |
| 2013/0254063 A1 | 9/2013 | Stone et al. | |
| 2013/0254650 A1 | 9/2013 | Huang et al. | |
| 2013/0268872 A1 | 10/2013 | Yin et al. | |
| 2013/0326343 A1* | 12/2013 | Phillips | G06F 40/103 |
| | | | 715/252 |
| 2013/0339877 A1 | 12/2013 | Skeen et al. | |
| 2013/0346302 A1 | 12/2013 | Purves et al. | |
| 2014/0019848 A1* | 1/2014 | Le Bescond de Coatpont | |
| | | | G01N 21/6428 |
| | | | 715/234 |
| 2014/0047321 A1 | 2/2014 | Prabhu et al. | |
| 2014/0047413 A1* | 2/2014 | Sheive | G06F 8/30 |
| | | | 717/110 |
| 2014/0052546 A1* | 2/2014 | Phan | G06Q 30/0277 |
| | | | 705/14.72 |
| 2014/0095329 A1* | 4/2014 | Liu | G06Q 30/0277 |
| | | | 705/14.73 |
| 2014/0122255 A1* | 5/2014 | Snyder | G06Q 30/0276 |
| | | | 705/14.72 |
| 2014/0149845 A1 | 5/2014 | Ansel et al. | |
| 2014/0195892 A1* | 7/2014 | Hampton | G06F 16/958 |
| | | | 715/234 |
| 2014/0222553 A1* | 8/2014 | Bowman | G06Q 30/0276 |
| | | | 705/14.45 |
| 2014/0223291 A1 | 8/2014 | Sharma | |
| 2014/0229821 A1* | 8/2014 | Abrahami | G06F 40/14 |
| | | | 715/235 |
| 2014/0244532 A1 | 8/2014 | Budzienski et al. | |
| 2014/0258836 A1 | 9/2014 | Horton et al. | |
| 2014/0258837 A1 | 9/2014 | Horton et al. | |
| 2014/0279520 A1 | 9/2014 | Armstrong et al. | |
| 2014/0282055 A1* | 9/2014 | Engel | G06F 3/0482 |
| | | | 715/744 |
| 2014/0297437 A1 | 10/2014 | Natarajan | |
| 2014/0337161 A1 | 11/2014 | Whisnant et al. | |
| 2014/0337768 A1* | 11/2014 | Hsu | G06F 40/197 |
| | | | 715/760 |
| 2014/0372923 A1 | 12/2014 | Rossi et al. | |
| 2014/0379507 A1 | 12/2014 | Pitt | |
| 2015/0006333 A1 | 1/2015 | Silveira et al. | |
| 2015/0007071 A1 | 1/2015 | Gilbert et al. | |
| 2015/0012818 A1 | 1/2015 | Reichmann et al. | |
| 2015/0074516 A1* | 3/2015 | Ben-Aharon | G06F 16/9577 |
| | | | 715/234 |
| 2015/0074518 A1 | 3/2015 | Rumsey et al. | |
| 2015/0089559 A1 | 3/2015 | Tyagi et al. | |
| 2015/0095768 A1* | 4/2015 | Rimmer | G06F 40/103 |
| | | | 715/238 |
| 2015/0121305 A1* | 4/2015 | Saund | G06Q 10/107 |
| | | | 715/810 |
| 2015/0169518 A1 | 6/2015 | Antipa et al. | |
| 2015/0170141 A1 | 6/2015 | Klingen | |
| 2015/0178759 A1 | 6/2015 | Glasgow | |
| 2015/0378524 A1* | 12/2015 | Wilde | G09G 5/373 |
| | | | 715/779 |
| 2016/0041954 A1* | 2/2016 | Bloch | G06F 16/986 |
| | | | 715/234 |
| 2016/0070814 A1* | 3/2016 | Baldwin | G06F 40/154 |
| | | | 715/236 |
| 2016/0103928 A1* | 4/2016 | Glasgow | G06F 40/14 |
| | | | 715/234 |
| 2016/0140622 A1 | 5/2016 | Wang et al. | |
| 2016/0300144 A1 | 10/2016 | Santhanam et al. | |
| 2017/0031875 A1 | 2/2017 | Luo et al. | |
| 2017/0103050 A9 | 4/2017 | Underwood et al. | |
| 2017/0109441 A1 | 4/2017 | Berk et al. | |
| 2017/0109763 A1 | 4/2017 | Tsai et al. | |
| 2017/0300897 A1 | 10/2017 | Ferenczi et al. | |
| 2018/0181484 A1 | 6/2018 | Jambu et al. | |
| 2018/0253718 A1 | 9/2018 | Khan et al. | |
| 2019/0073120 A1 | 3/2019 | Bloch et al. | |
| 2019/0102067 A1 | 4/2019 | Glasgow et al. | |
| 2019/0155496 A1 | 5/2019 | Bloch et al. | |
| 2019/0155497 A1 | 5/2019 | Bloch et al. | |
| 2019/0180272 A1 | 6/2019 | Douglas | |
| 2020/0183553 A1 | 6/2020 | Al-Sallami et al. | |
| 2020/0183554 A1 | 6/2020 | Al-Sallami et al. | |
| 2020/0183555 A1 | 6/2020 | Al-Sallami et al. | |
| 2021/0026526 A1 | 1/2021 | Bloch et al. | |

OTHER PUBLICATIONS

Marcotte, E.,"Responsive Web Design," May 25, 2010, in A List Apart blog, 52 pages.*
Margotte, E.,"Fluid Images," Jun. 7, 2011, in A List Apart blog. Also portion of Chapter 3 of Responsive Web Design, 29 pages.*
Non-Final Office Action dated Feb. 14, 2020, for U.S. Appl. No. 16/261,452, of Al-Sallami, W., et al., filed Jan. 29, 2019.
Non-Final Office Action dated Feb. 13, 2020, for U.S. Appl. No. 16/261,392, of Al-Sallami, W., et al., filed Jan. 29, 2019.
Notice of Allowance dated Feb. 28, 2020, for U.S. Appl. No. 16/256,884, of Bloch, B., A., et al., filed Jan. 24, 2019.
Notice of Allowance dated Mar. 27, 2020, for U.S. Appl. No. 16/261,423, of Al-Sallami, W., et al., filed Jan. 29, 2019.
Wollman, D., "Chrome OS review (version 19)," Engadget, published May 29, 2012, Retrieved from the Internet URL: https://www.engadget.com/2012/05/29/chrome-os-review-version-19/, pp. 1-27.
Non-Final Office Action dated Apr. 7, 2016, for U.S. Appl. No. 14/452,390 of Bloch, B., A., et al., filed Aug. 5, 2014.
Final Office Action dated Sep. 23, 2016, for U.S. Appl. No. 14/452,390 of Bloch, B., A., et al., filed Aug. 5, 2014.
Non-Final Office Action dated Jan. 11, 2017, for U.S. Appl. No. 14/878,878 of Glasgow, R.J., et al., filed Oct. 8, 2015.
Final Office Action dated Jul. 24, 2017, for U.S. Appl. No. 14/878,878 of Glasgow, R.J., et al., filed Oct. 8, 2015.
Non-Final Office Action dated Oct. 4, 2017, for U.S. Appl. No. 15/465,462 of Bloch, B.A., et al., filed Mar. 21, 2017.
Final Office Action dated Jan. 18, 2018, for U.S. Appl. No. 15/465,462 of Bloch, B.A., et al., filed Mar. 21, 2017.
Non-Final Office Action dated Mar. 8, 2018, for U.S. Appl. No. 14/878,878, of Glasgow, R.J., et al. filed Oct. 8, 2015.
Notice of Allowance dated Jun. 20, 2018, for U.S. Appl. No. 15/465,462 of Bloch, B.A., et al., filed Mar. 21, 2017.
Notice of Allowance dated Jul. 3, 2018, for U.S. Appl. No. 14/878,878, of Glasgow, R.J., et al., filed Oct. 8, 2015.
Non-Final Office Action dated Dec. 31, 2018, for U.S. Appl. No. 16/165,751, of Bloch, B.A., et al., filed Oct. 19, 2018.
Non-Final Office Action dated Mar. 18, 2019, for U.S. Appl. No. 16/256,884, of Bloch, B.A., et al., filed Jan. 24, 2019.
Non-Final Office Action dated Mar. 18, 2019, for U.S. Appl. No. 16/256,886, of Bloch, B.,A., et al., filed Jan. 24, 2019.
Notice of Allowance dated Apr. 23, 2019, for U.S. Appl. No. 16/261,434, of Al-Sallami, W., et al., filed Jan. 29, 2019.
Non-Final Office Action dated Apr. 24, 2019, for U.S. Appl. No. 16/261,423, of Al-Sallami, W., et al., filed Jan. 29, 2019.
Non-Final Office Action dated May 24, 2019, for U.S. Appl. No. 16/261,392, of Al-Sallami, W., et al., filed Jan. 29, 2019.
Notice of Allowance dated Jun. 20, 2019, for U.S. Appl. No. 16/165,751, of Bloch, B.A., et al., filed Oct. 19, 2018.
Final Office Action dated Jul. 10, 2019, for U.S. Appl. No. 16/256,886, of Bloch, B.,A., et al., filed Jan. 24, 2019.
Final Office Action dated Jul. 10, 2019, for U.S. Appl. No. 16/256,884, of Bloch, B.,A., et al., filed Jan. 24, 2019.
International Search Report and Written Opinion for international Application No. PCT/US2015/022818, dated Jun. 29, 2015.
Advisory Action dated Dec. 16, 2019, for U.S. Appl. No. 16/261,392, of Al-Sallami, W., et al., filed Jan. 29, 2019.

(56) References Cited

OTHER PUBLICATIONS

Advisory Action dated Jan. 15, 2020, for U.S. Appl. No. 16/261,423, of Al-Sallami, W., et al., filed Jan. 29, 2019.
Notice of Allowance dated Feb. 6, 2020, for U.S. Appl. No. 16/256,886, of Bloch, B., A., et al., filed Jan. 24, 2019.
Notice of Allowance dated Feb. 6, 2020, for U.S. Appl. No. 16/256,884, of Bloch, B., A., et al., filed Jan. 24, 2019.
International Search Report and Written Opinion for PCT Application No. PCT/US2019/057801 dated Jan. 22, 2020.
Advisory Action dated Sep. 24, 2019, for U.S. Appl. No. 16/256,884, of Bloch, B.,A., et al., filed Jan. 24, 2019.
Final Office Action dated Oct. 3, 2019, for U.S. Appl. No. 16/261,392, of Al-Sallami, W., et al., filed Jan. 29, 2019.
Final Office Action dated Oct. 29, 2019, for U.S. Appl. No. 16/261,423, of Al-Sallami, W., et al., filed Jan. 29, 2019.
Final Office Action dated May 29, 2020, for U.S. Appl. No. 16/261,392, of Al-Sallami, W., et al., filed Jan. 29, 2019.
Non-Final Office Action dated Nov. 5, 2020, for U.S. Appl. No. 15/931,026, of Bloch, B. A. et al., filed May 13, 2020.
Non-Final Office Action dated Jul. 9, 2020, for U.S. Appl. No. 16/200,354 of Glasgow, R. J. et al., filed Nov. 26, 2018.
Notice of Allowance dated Jul. 17, 2020, for U.S. Appl. No. 16/261,423, of Al-Sallami, W., et al., filed Jan. 29, 2019.
Advisory Action dated Aug. 7, 2020, for U.S. Appl. No. 16/261,392, of Al-Sallami, W., et al., filed Jan. 29, 2019.
Final Office Action dated Feb. 2, 2021, for U.S. Appl. No. 16/200,354 of Glasgow, R. J. et al., filed Nov. 26, 2018.
Final Office Action dated Feb. 22, 2021, for U.S. Appl. No. 15/931,026, of Bloch, B. A. et al., filed May 13, 2020.
Advisory Action dated Apr. 29, 2021, for U.S. Appl. No. 15/931,026, of Bloch, B. A. et al., filed May 13, 2020.
Bidelman, E., "Native HTM L5 Drag and Drop," Sep. 30, 2010, HTML5 Rocks blog, 11 pages.
Notice of Allowance dated Jul. 9, 2021, for U.S. Appl. No. 15/931,026, of Bloch, B. A. et al., filed May 13, 2020.
Non Final Action dated Jul. 21, 2021, for U.S. Appl. No. 16/200,354 of Glasgow, R. J. et al., filed Nov. 26, 2018.
Notice of Allowance dated Aug. 11, 2021, for U.S. Appl. No. 15/931,026, of Bloch, B. A. et al., filed May 13, 2020.
Final Office Action dated Mar. 8, 2022, for U.S. Appl. No. 16/200,354 of Glasgow, R. J. et al., filed Nov. 26, 2018.
Advisory Action dated May 26, 2022, for U.S. Appl. No. 16/200,354 of Glasgow, R. J. et al., filed Nov. 26, 2018.
Non-Final Office Action dated Jun. 10, 2022, for U.S. Appl. No. 16/200,354 of Glasgow, R. J. et al., filed Nov. 26, 2018.

\* cited by examiner

USER INTERFACE FOR EDITING WEB CONTENT

CROSS-REFERENCE TO RELATED APPLICATIONS

This application is a continuation of and claims priority to U.S. patent application Ser. No. 16/200,354, filed on Nov. 26, 2018, which is a continuation of and claims priority to U.S. application Ser. No. 14/878,878, entitled "USER INTERFACE FOR EDITING WEB CONTENT", filed on Oct. 8, 2015, now known as U.S. Pat. No. 10,139,998, issued on Nov. 27, 2018, which claims the benefit of U.S. Provisional Application No. 62/061,691, filed Oct. 8, 2014, which is incorporated by reference herein.

BACKGROUND

1. Technical Field

This invention pertains in general to editing web content, and in particular to a user interface that allows a user to make edits to a web page on a smartphone, tablet, or other mobile client device.

2. Description of Related Art

In many parts of the world, people have come to expect every organization, event, and public figure to have a web site. As a result, many web editing applications have been developed to allow users who are unfamiliar with HTML, XML, Javascript, CSS, or other web design tools to create and maintain professional and aesthetically pleasing websites. Some of these web editing applications allow users to change or add content to a web page.

Conventional web editing applications may not be optimized for editing or viewing web pages on mobile client devices such as smartphones and tablets. However, many users prefer to use tablet computers, smartphones, and other mobile devices to perform their computing tasks. For example, users may favor the flexibility of working in different locations or the intuitive touchscreen interface that is present on most modern-day mobile devices.

One critical drawback to mobile devices is that they generally have smaller screens than other client devices. As a result, they are poorly-suited to viewing and editing web pages on mobile client devices.

SUMMARY

Embodiments of the invention include a method, a non-transitory computer readable storage medium, and a system for providing a user interface for editing a web page. A web editing application provides user interfaces for creating and editing web pages on a mobile device. The web editing application may provide users with previews of web page templates for use in creating and/or editing web pages. Upon user selection of a web page template, the web editing application provides a user interface for editing the web page. Edited web pages or changes to web pages are sent to a web editing server once editing has occurred. In one embodiment, users can edit web pages while a client device is offline, and changes are queued for sending to the web editing server once the client device is online.

A web editing application executing on a client device interacts with a web rendering module in the operating system to render and display the web page. The web rendering module also generates layout data that describes the position and size of each visual element on the rendered web page, and the web editing application uses the layout data to generate a native overlay. The native overlay is an arrangement of one or more cells, and each cell has the same position and size as a respective visual element or group of visual elements. The web editing application displays the native overlay on top of the rendered webpage so that each visual element or collection of visual elements on the rendered web page is aligned with a cell in the native overlay.

In one embodiment, the web editing application determines whether a display of the client device is in landscape mode or portrait mode, and arranges certain cells differently based on this determination. The web editing application may further provide cell configuration indicators that indicate cells that are arranged differently in different display modes. Providing this functionality allows for more efficient use of screen space of a display. This may be particularly advantageous for mobile client devices, which may have smaller displays, because it allows users to see more content on the screen without having to scroll or zoom.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Overview

Figure 1:
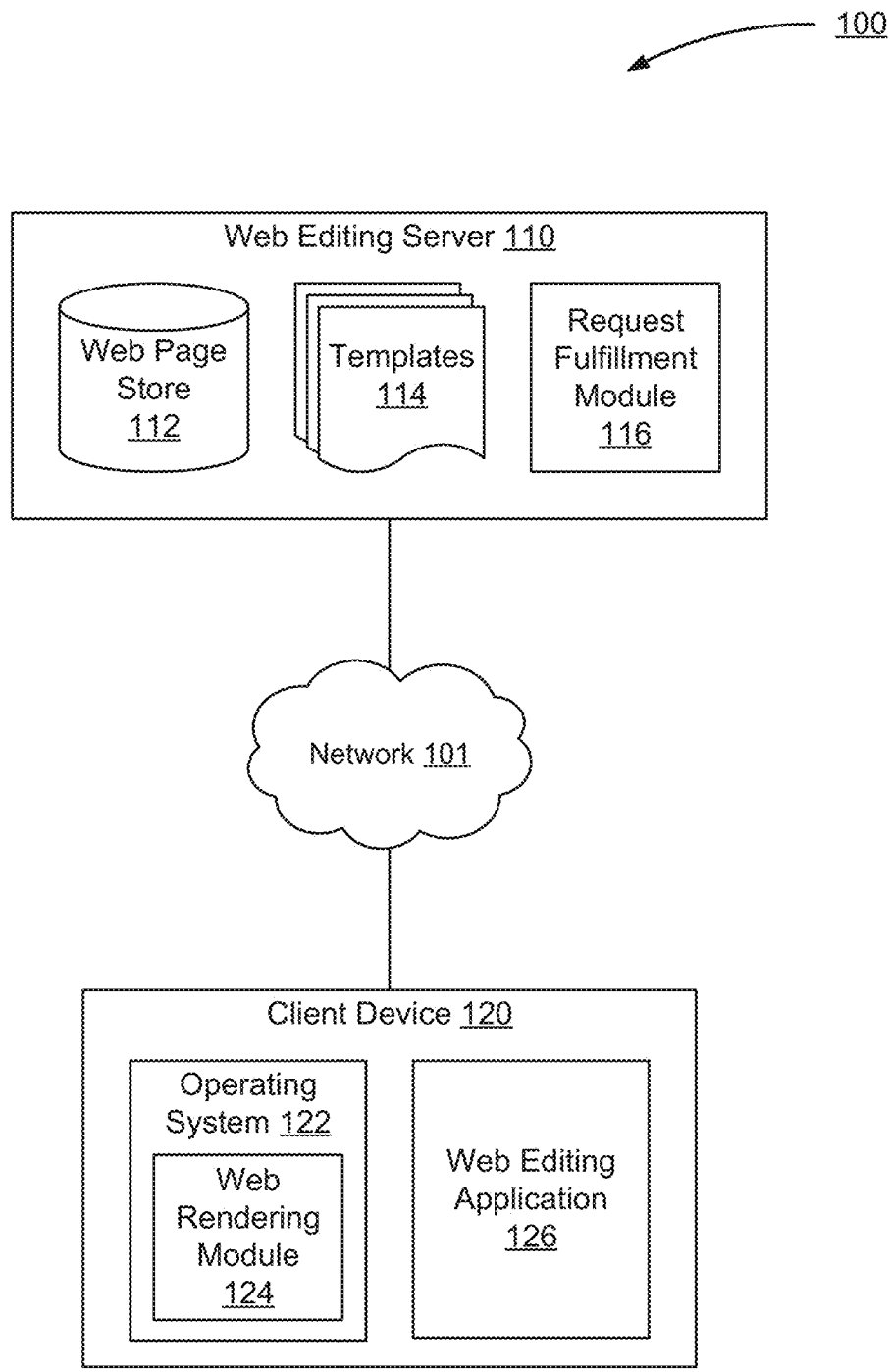
FIG. 1 is a block diagram of a computing environment for editing web content, in accordance with an embodiment.

FIG. 1 is a block diagram of a computing environment 100 for editing web content, in accordance with an embodiment. The computing environment 100 includes a web editing server 110 and a client device 120 connected by a network 101. Although only one web editing server 110 and one client device 120 are illustrated, in practice there may be multiple instances of these two entities. For example, there may be thousands or millions of client devices 120 in communication with several or many web editing servers 110.

The web editing server 110 stores web pages created by users and provides templates for new web pages. As used herein, a web page is a data item that can be rendered to generate a page of content with one or more visual elements. Examples of visual elements include images, videos, headings, and body text. In some embodiments, some elements of a web page may contain other elements. For example, a column element may contain body text or image elements. Web pages can also include interactive visual elements that change appearance automatically or in response to a user interaction within the visual element. For example, a web page may include a slideshow element that displays a series of predetermined images. The slideshow may switch to a different image after a certain time interval has elapsed or in response to a user input. As another example, a web page may include a map element that presents an interactive map with interactive zooming and panning functions.

In some embodiments, the web editing server 110 is implemented as a single server, while in other embodiments it is implemented as a distributed system of multiple servers. The web editing server 110 includes a web page store 112, web page templates 114, and a request fulfillment module 116.

The web page store 112 includes a plurality of web pages created by users of the web editing server 110. Each web page in the web page store 112 includes instructions that define the size, position, and content of visual elements on the page. In one embodiment, the instructions are stored as structured data (e.g., JSON data) that can be used to assemble markup language (e.g., HTML) describing the page. In this embodiment, the structured data may include portions of markup language. In another embodiment, the instructions are stored in a markup language and not as structured data. The content of a visual element can either be included as part of the instructions for the corresponding web page or stored as separate data items that are referenced in the instructions for the web page. For example, body text and headings on the web page are included as part of the instructions, but images on the web page are stored as separate files and instructions include references to those files. Separate data items can be stored alongside the web pages in the web page store 112 or on a separate server that is accessible via the network 101.

The web pages in the web page store 112 can be organized into web sites. A website includes one or more individual web pages that are connected to each other (e.g., with hyperlinks). In addition to the individual web pages, a website can also include a page hierarchy and theme content.

A page hierarchy describes relationships between different pages of the website. For example, the page hierarchy may organize the website into a tree structure with the home page at the root, pages for the main sections of the website as branches connected to the root, and pages representing sub-sections as leaves connected to each branch.

Theme content is data that defines visual characteristics of one or more web pages. In one embodiment, theme content is written in Cascading Style Sheets (CSS). For example, the theme content defines formatting settings such as the size, font, and color of text, hyperlinks, and headings, the color and size of borders, and the sizes of margins. The theme content may also define layout settings such as the position of a main heading on each page and the position of hyperlinks for navigating to other sections of the website. It is advantageous to store a single item of theme content for a website rather than a separate item of theme content for each web page because web pages in a website typically have the same layout, formatting, and other visual characteristics.

The web page templates 114 are data items that can be used to create new web pages and websites. Each template 114 includes theme content, as described above. In addition to theme content, a template 114 may also include other content for defining the appearance of the web page, such as custom typefaces or graphics. A template 114 may additionally include sample images and text (e.g., lorem ipsum text) to provide a user with a representation of how the web page will appear after the user's content is added.

The request fulfillment module 116 receives and processes requests from client devices 120 to retrieve templates 114 and web pages. For example, the module 116 receives requests from client devices 120 to load a web page for a user of the client device 120 to edit and provides the requested web page to the client device 120. After users make edits to the web page, the module 116 also receives and fulfills requests to update that web page in the web page store 112 to incorporate the user's edits.

The client device 120 is a computing device that allows a user to interact with the web editing server 110 to create and edit web pages. For example, the client device 120 may be a mobile device such as a tablet computer or a smart phone. The client device 120 may alternatively be a laptop or desktop computer. As shown in FIG. 1, the client device 120 executes an operating system 122 and a web editing application 126.

Figure 8:
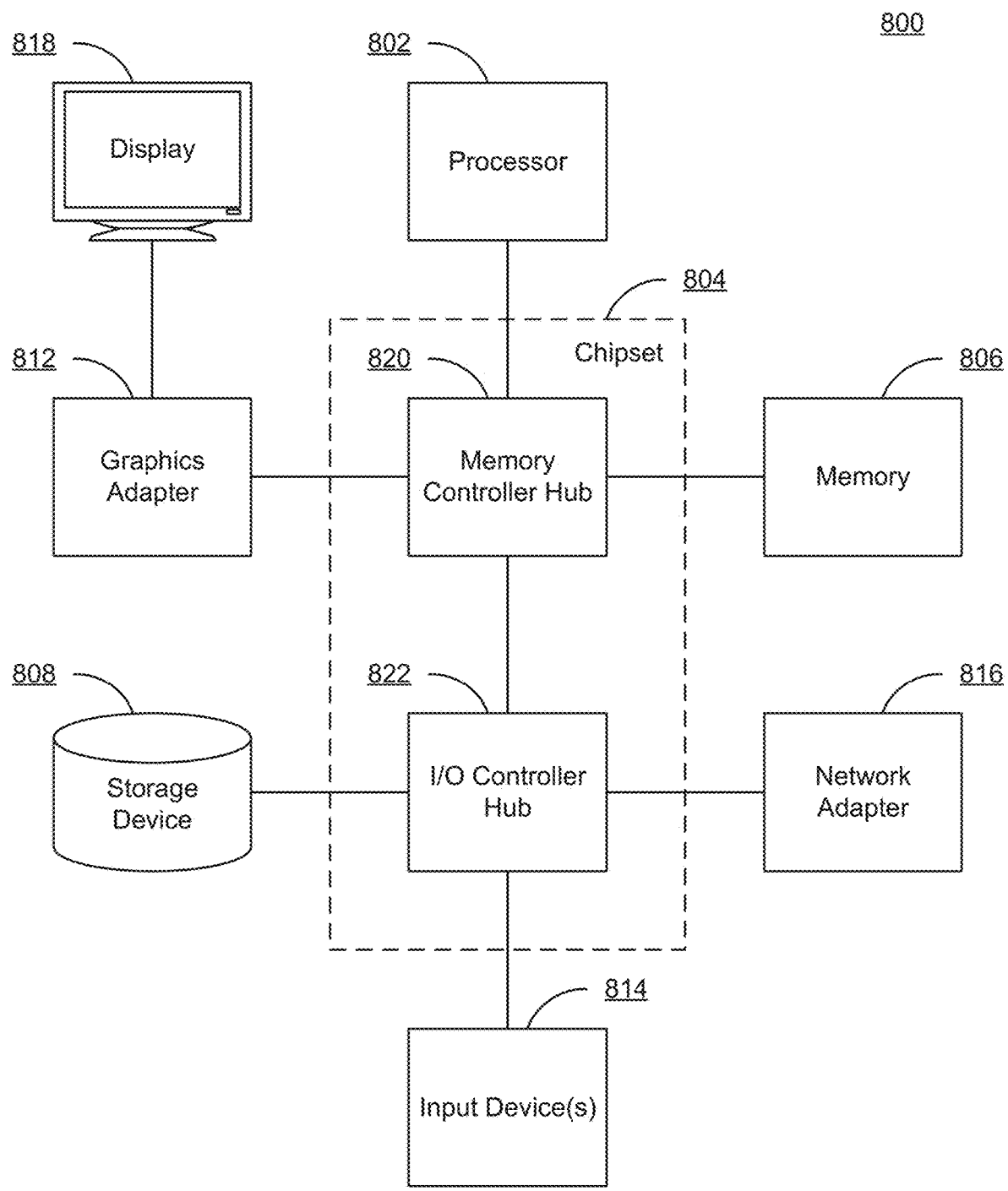
FIG. 8 is a high-level block diagram of the components of a computing system for use, for example, as the web editing server or the client device shown in FIG. 1, in accordance with an embodiment.

The operating system 122 provides modules that allow applications on the client device 120 (e.g., the web editing application 126) to interact with hardware components of the client device 120, such as the hardware components described in FIG. 8. One of these modules is the web rendering module 124, which receives instructions for rendering a web page (e.g., in JSON or HTML) and executes the instructions to render a visual representation of the web page. As described above with reference to the web editing server 110, a rendered web page includes one or more visual elements, such as images, videos, body text, and headings. The web rendering module 124 can also contain components that interpret structured data (e.g., JSON) to assemble markup language (e.g., HTML) and generate layout data (data describing the position and size of each visual element on a rendered web page) based on a rendered web page. The layout data can subsequently be provided to other components of the client device 110, such as the web editing application 126. In one embodiment, the operating system 122 is APPLE IOS and the web rendering module 124 is the UIWebView class. In another embodiment, the operating system 122 is GOOGLE ANDROID and the web rendering module 124 is the WebView class. An embodiment of the web rendering module 124 is described in detail with reference to FIG. 2B.

The web editing application 126 retrieves web pages and templates 114 from the web editing server 110 (e.g., via the request fulfillment module 116) and operates in conjunction with the web rendering module 124 to provide an interface that allows a user to edit the web pages. The interface includes a native overlay that is generated based on the layout data provided by the web rendering module 124. The process of generating the native overlay and making edits to web pages via the native overlay is described in detail with reference to FIGS. 2A, 3, 4A, 5A, and 6A. The process of providing a user interface that allows a user to create and edit the web pages is described in detail with reference to FIG. 7A. After the user makes one or more edits to a web page, the web editing application 126 also sends edited web pages back to the web editing server 110 to be stored in the web page store 112. In one embodiment, the user may make edits to a web page while the client device 120 is offline with respect to the network 101 or otherwise unable to communicate with the web editing server 110. In this embodiment, edited web pages are stored on the client device 120 until the client device 120 is online and able to send the edited web pages to the web editing server 110.

The network 101 provides a communication infrastructure between the web editing server 110 and the client device 120. The network 101 is typically the Internet, but may be any network, including but not limited to a Local Area Network (LAN), a Metropolitan Area Network (MAN), a Wide Area Network (WAN), a mobile wired or wireless network, a private network, or a virtual private network.

Figure 2A:
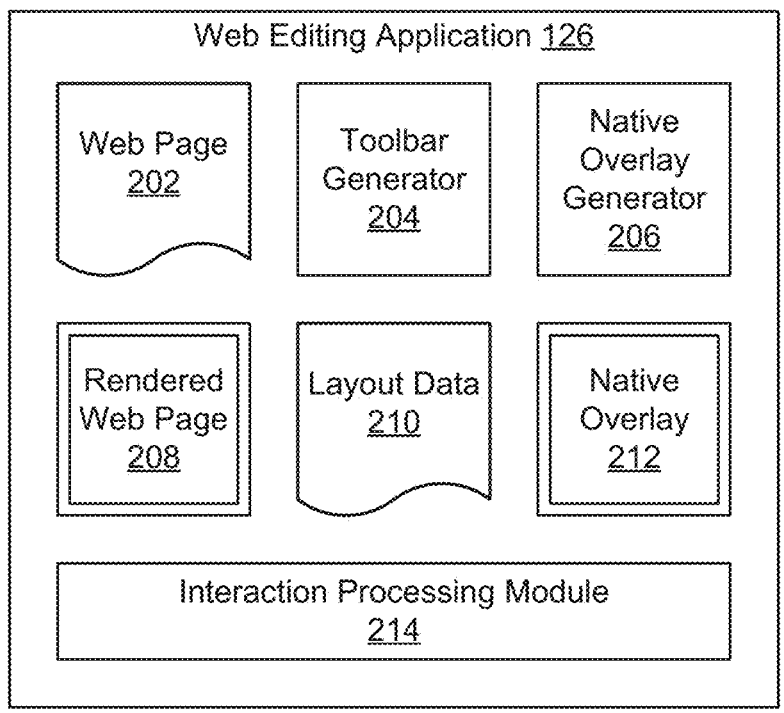
FIG. 2A is a block diagram illustrating components of the web editing application shown in FIG. 1, in accordance with an embodiment.

FIG. 2A is a block diagram illustrating components of the web editing application 126 shown in FIG. 1, in accordance with an embodiment. The web editing application 126 includes a web page 202, a toolbar generator 204, a native overlay generator 206, a rendered web page 208, layout data 210, a native overlay 212, and an interaction processing module 214. In other embodiments, the web editing application 126 may include additional or fewer components, and the functionality of the web editing application 126 may be distributed among its components in a different manner.

The web page 202 is a local copy of a web page in the web page store 112. As described above with reference to the web editing server 110, the web page 202 includes instructions (e.g., stored as structured data, such as JSON, that may include portions of markup language in HTML) that can be executed to render the web page, and the instructions define the size, position, and content of the visual elements on the rendered web page 208. Although only one web page 202 is shown in FIG. 2A, the web editing application 126 may store multiple web pages at once. Storing multiple web pages advantageously allows the user to rapidly switch from one web page to another web page without waiting for the web editing application 126 to retrieve the other web page from the web editing server 110. The web editing application 126 may also store theme content and a page hierarchy associated with the web page 202. In one embodiment, the web editing application 126 stores the web pages, theme content, and page hierarchy for an entire website. The web editing application 126 may alternatively store a subset of the pages in a website or subsets of pages from multiple websites. In one embodiment, the web editing application 126 allows for offline editing of web pages. A user may access stored web pages, theme content, and other stored data for editing a web page when the client device 120 is offline.

The toolbar generator 204 provides one or more visual toolbars containing options that allow the user to edit the web page. Some of the toolbars include options to add visual elements to the page. For example, a toolbar may include options to add a paragraph of text, a map, an image, or a slideshow. The toolbars may also provide options to change visual characteristics of the pages, such as the background color of the page or the size, color, and font of body text and headings on the page. These changes can be stored as part of the web page (e.g., if they are specific to the page) or as part of the theme content (e.g., if they affect multiple web pages that are associated with the same item of theme content). In addition to toolbars, the toolbar generator 204 may also present provide other interface elements, such as menus and status bars.

The native overlay generator 206 sends the web page 202 to the web rendering module 124, which causes the web rendering module 124 to render and display a visual representation of the web page 202. The visual representation of the web page 202 is referred to herein as the rendered web page 208. The process of rendering and displaying a rendered web page 208 is described in further detail below with reference to the structured data interpreter 252 and the web rendering engine 254 in FIG. 2B. The web rendering module 124 also generates and returns layout data 210 about the rendered web page 208. The process of generating the layout data 210 is described in further detail below with reference to the layout data generator 256 in FIG. 2B.

As described above with reference to the web rendering module 124, the layout data 210 describes the position and size of visual elements on the rendered web page 208. For example, the layout data 210 includes a set of x and y coordinates describing the position of the upper-left corner of each visual element and a set of x and y dimensions describing the size of each visual element. In some embodiments, the layout data 210 stores the position and size of each visual element in association with an identifier that uniquely identifies the visual element.

In one embodiment, the layout data 210 specifies more than one different position or size for each visual element. The web rendering module 124 selects the appropriate position or size data based on characteristics of a display on which the web page 202 is displayed. For example, the layout data 210 may have a first set of coordinates and dimensions for each visual element for display on a landscape orientation display, and a second set of coordinates and dimensions for each visual element for display on a portrait orientation display. In one embodiment, a display is capable of being rotated from a portrait orientation to a landscape orientation. The web rendering module 124 is notified of a rotation and may re-render the web page 202 using the appropriate layout data 210. Having separate positions and sizes for visual elements depending on display characteristics allows for more efficient use of screen space, especially in the case of devices having a limited display area such as smartphones.

After receiving the layout data 210, the native overlay generator 206 causes the client device 120 to generate a native overlay 212. The native overlay 212 includes an arrangement of one or more cells, and each cell has a position and size that matches a respective visual element or group of visual elements of the rendered web page 208. In one embodiment, the native overlay generator 206 interacts with a layout generation module in the operating system 122 to generate the native overlay 212. For example, if the operating system 122 is APPLE IOS, the native overlay generator 206 creates an instance of the UICollectionView class to generate the native overlay 212. As another example, if the operating system 122 is GOOGLE ANDROID, the native overlay generator 206 creates an instance of the ViewGroup class. In this embodiment, the layout generation module is configured to receive instructions that define the position and size of each cell. In one embodiment, the native overlay 212 comprises one cell, and the layout data 210 defines positions of one or more visual elements within the cell. To prepare these instructions, the native overlay generator 206 may perform a transformation on the layout data 210 received from the web rendering module 124. For example, if the layout data 210 defines the upper left corner of each cell but the layout generation module is configured to receive instructions that define the center of each cell, then the native overlay generator 206 performs a transformation to convert the coordinates for each cell's upper left corner to coordinates for each cell's center. Alternatively, the native overlay generator 206 may use the unmodified layout data 210 as the instructions.

In one embodiment, each cell in the native overlay 212 is transparent, and the native overlay generator 206 causes the native overlay 212 to be displayed on top of the rendered web page 208. As a result, the rendered web page 208 remains visible under the native overlay 212, but the native overlay 212 captures any gestures or other interactions that the user performs on the screen.

The interaction processing module 214 receives user interactions with the toolbars and the native overlay 212 and makes corresponding changes to the web page 202. After receiving a user interaction, the interaction processing module 214 updates the web page 202 and passes the updated web page 202 to the web rendering module 124 to be rendered. In addition to rendering and displaying the updated web page 202 to the user, the web rendering module 124 also generates and returns updated layout data 210 to the native overlay generator 206, and the native overlay generator 206 regenerates the native overlay 212. The interaction processing module 214 can also send the updated web page 202 to the server 110 to be saved in the web page store 112. In one embodiment, only the changes to a web page 202 are sent to the server 110. In this embodiment, the server 110 updates the version of the web page 202 stored in the web page store 112 by applying the received changes.

User interactions that change the layout of the web page 202 can include, for example, moving a visual element, adding a new visual element from a toolbar, editing an existing visual element (e.g., by resizing the visual element), or deleting an existing visual element. These example interactions are described in further detail with reference to FIGS. 4A, 5A, and 6A.

Figure 2B:
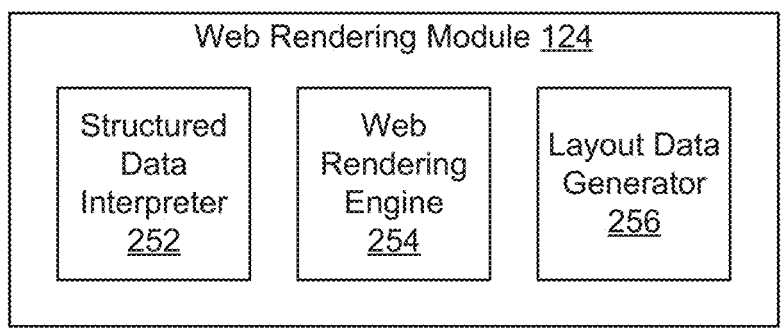
FIG. 2B is a block diagram illustrating components of the web rendering module shown in FIG. 1, in accordance with an embodiment.

FIG. 2B is a block diagram illustrating components of the web rendering module 124 shown in FIG. 1, in accordance with an embodiment. The web editing application 124 includes a structured data interpreter 252, a web rendering engine 254, and a layout data generator 256. In other embodiments, the web rendering module 124 may include additional or fewer components, and the functionality of the web editing application 126 may be distributed among its components in a different manner.

In embodiments where the web page 202 is stored in the web editing application 126 as structured data (e.g., JSON), the structured data interpreter 252 interprets the structured data to assemble markup language describing the web page (e.g., HTML). In one embodiment, the structured data interpreter 252 is provided by the same developer as the web editing application 126. For example, the developer that provides the web editing application 126 also provides JavaScript code (which can be executed by the web rendering module 124) that implements the structured data interpreter 252.

The web rendering engine 254 is a layout engine that receives markup language (e.g., HTML) describing a web page and generates a rendered web page 208. In embodiments where the web page 202 is stored in the web editing application 126 as structured data, the web rendering engine 254 receives markup language from the structured data interpreter 252. The web rendering engine 254 may alternatively receive markup language directly from the web editing application (e.g., if the web page 202 is stored as markup language). Unlike the structured data interpreter 252, which may be provided by the same developer as the web editing application 126, the web rendering engine 254 is typically provided as part of the operating system 122. For example, the web rendering engine 254 is the WebKit layout engine that is included as part of APPLE IOS.

The layout data generator 256 generates the layout data 210 by querying the web rendering engine 254 for information describing the position and size of each visual element on the rendered web page 208. In one embodiment, the layout data generator 256 arranges the position and size information into a structured format (e.g., JSON) and provides the layout data 210 in this structured format. When generating the layout data 210, the layout data generator 256 may also associate each item of position and size information with an identifier for the corresponding visual element. Similar to the structured data interpreter, the layout data generator 256 may also be provided by the same developer as the web editing application 126. For example, the developer provides JavaScript code that can be executed by the web rendering module 124 to perform the functions of the layout data generator 256. In one embodiment, a single module of JavaScript code implements both the structured data interpreter 252 and the layout data generator 256.

Example Method

Figure 3A:
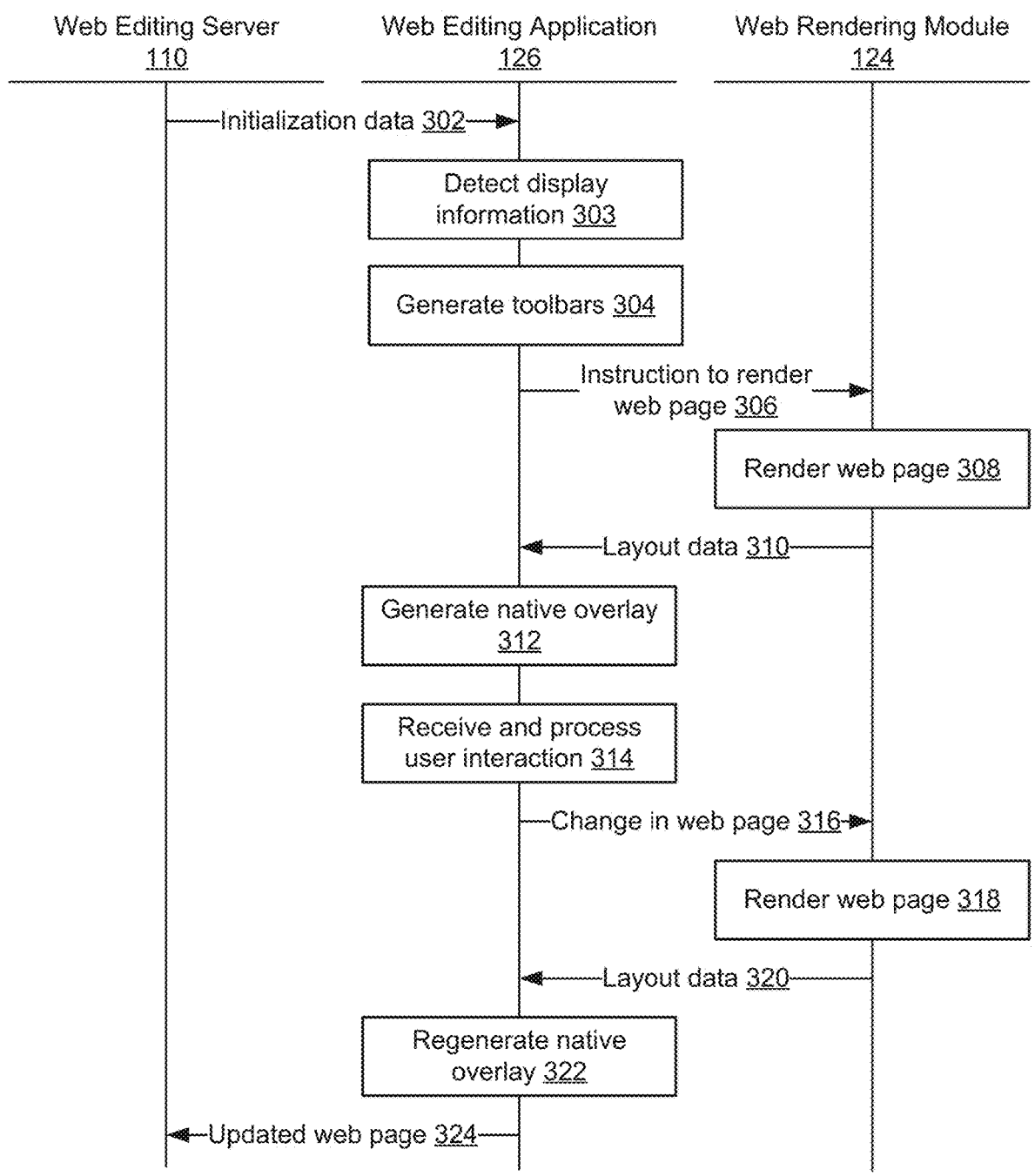
FIG. 3A is a flow chart illustrating a method of editing web content, in accordance with an embodiment.
Figure 3B:
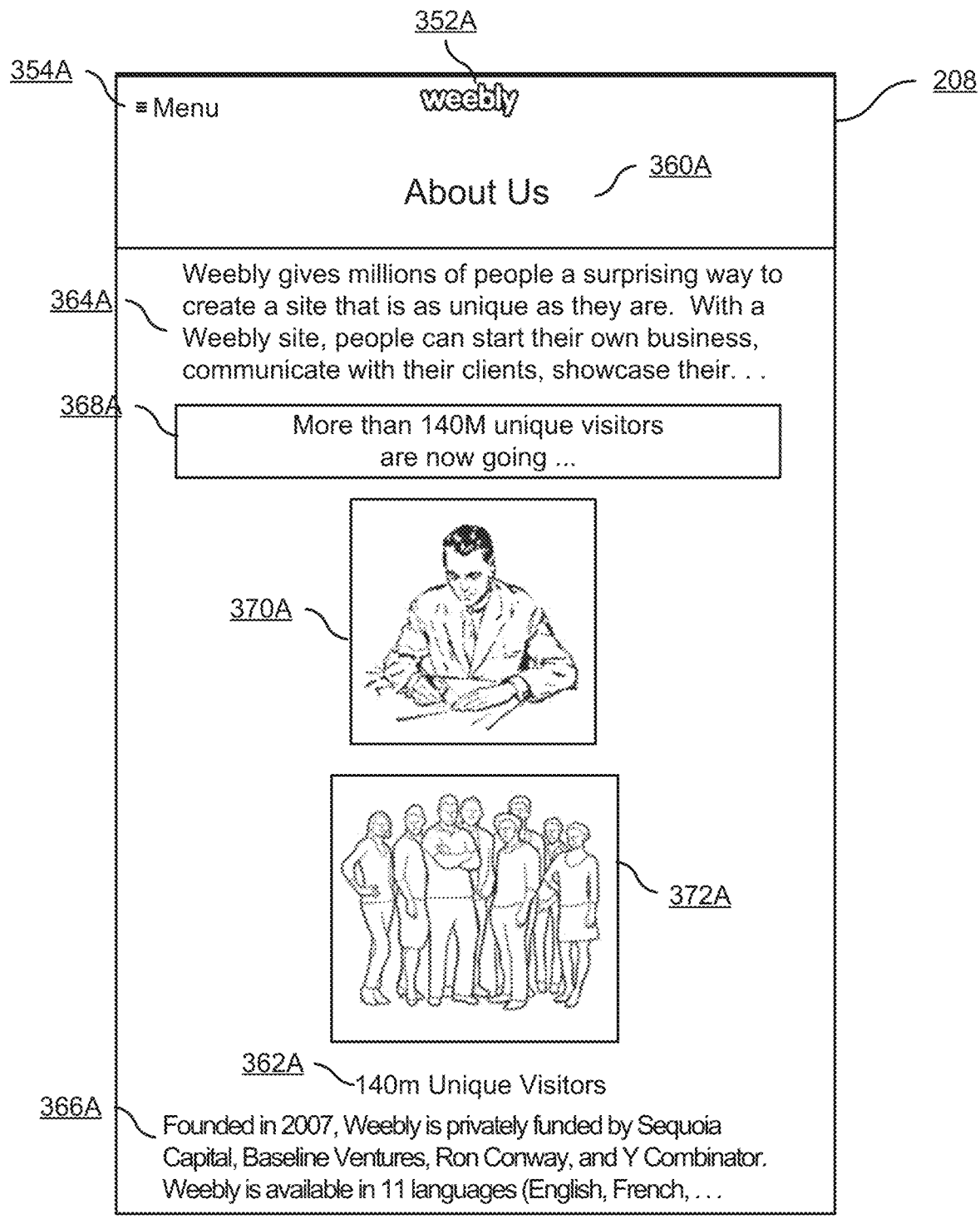
FIGS. 3B-3E illustrate an example of a rendered web page and a corresponding native overlay, in accordance with an embodiment.
Figure 3C:
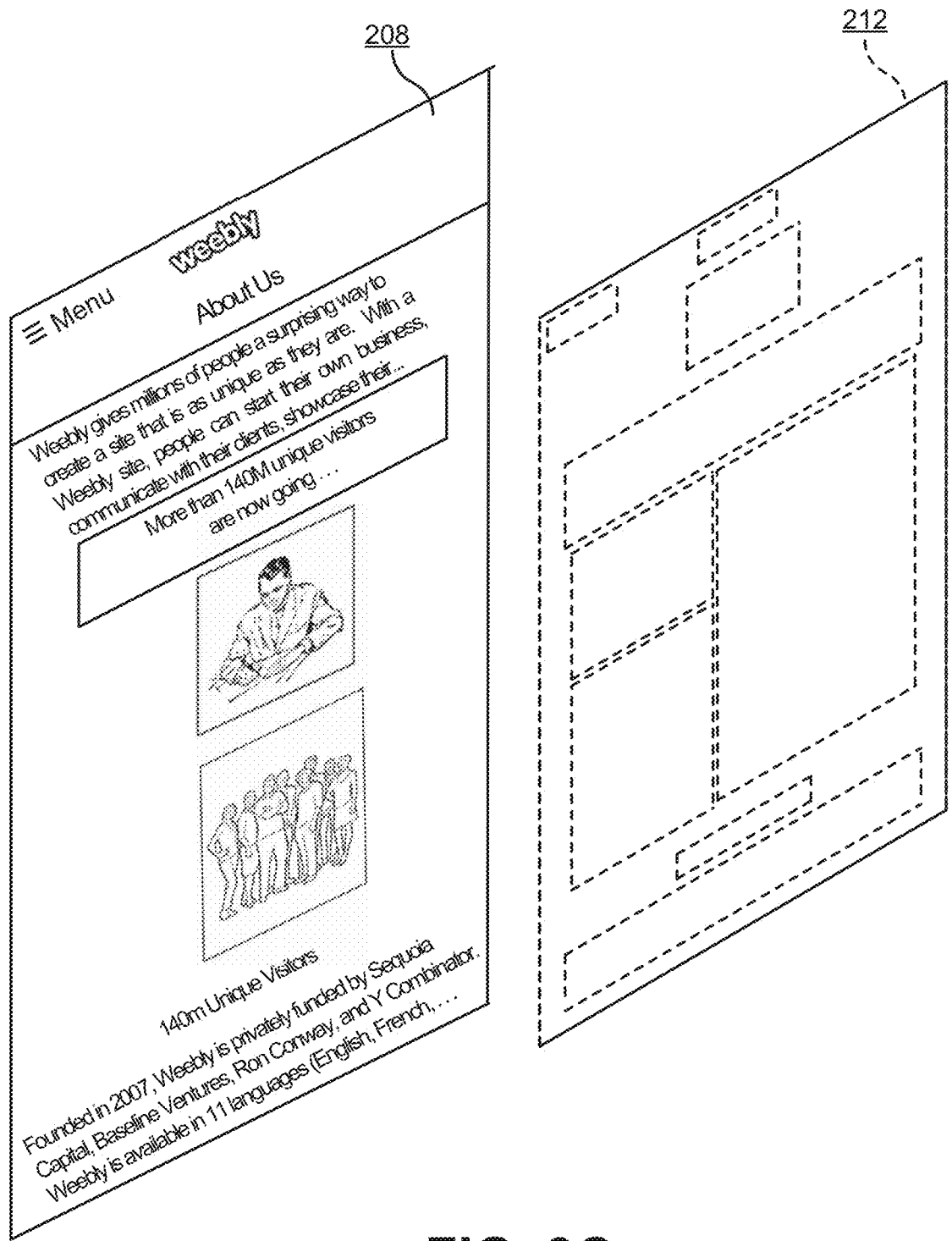
Figure 3D:
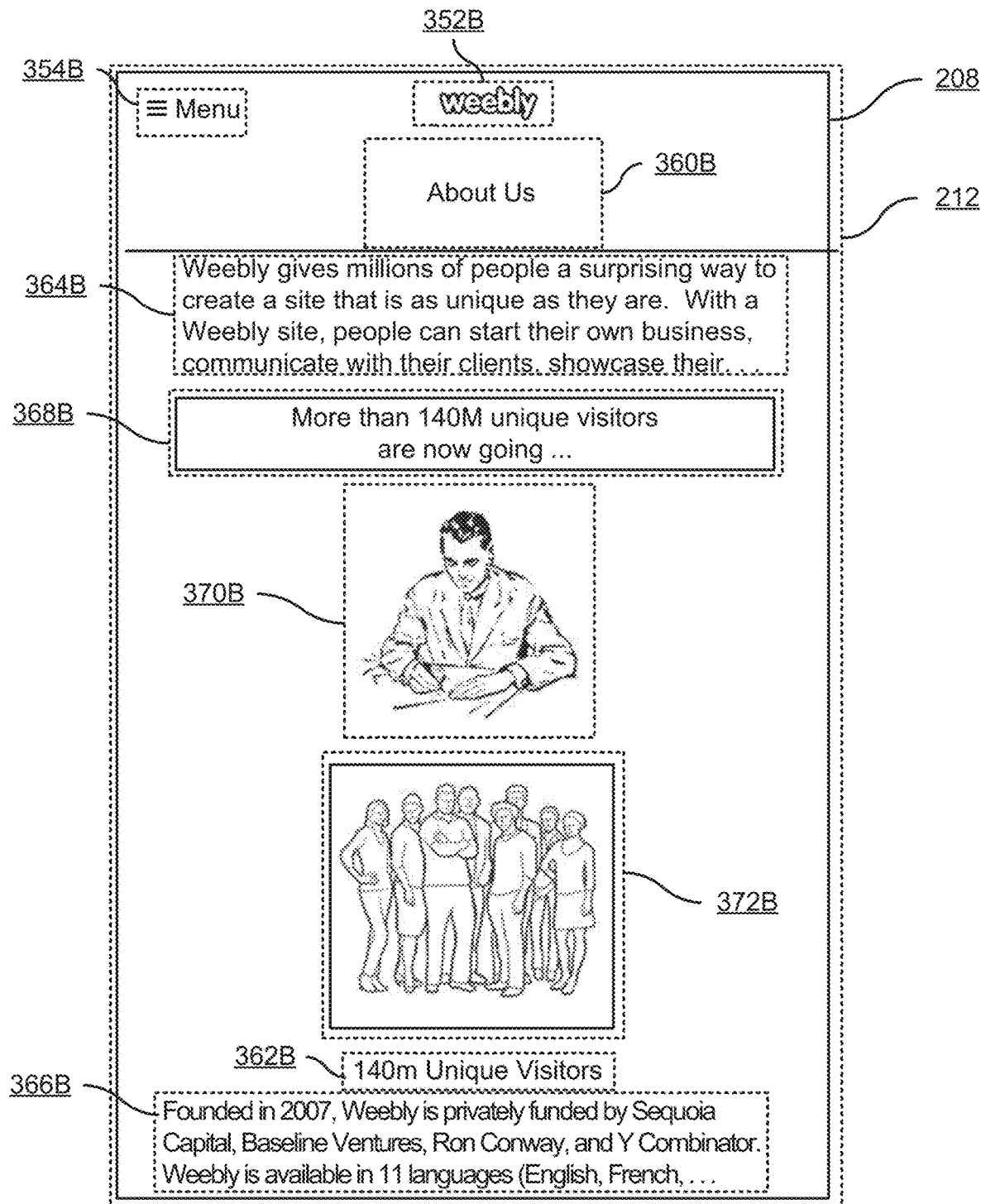
Figure 3E:
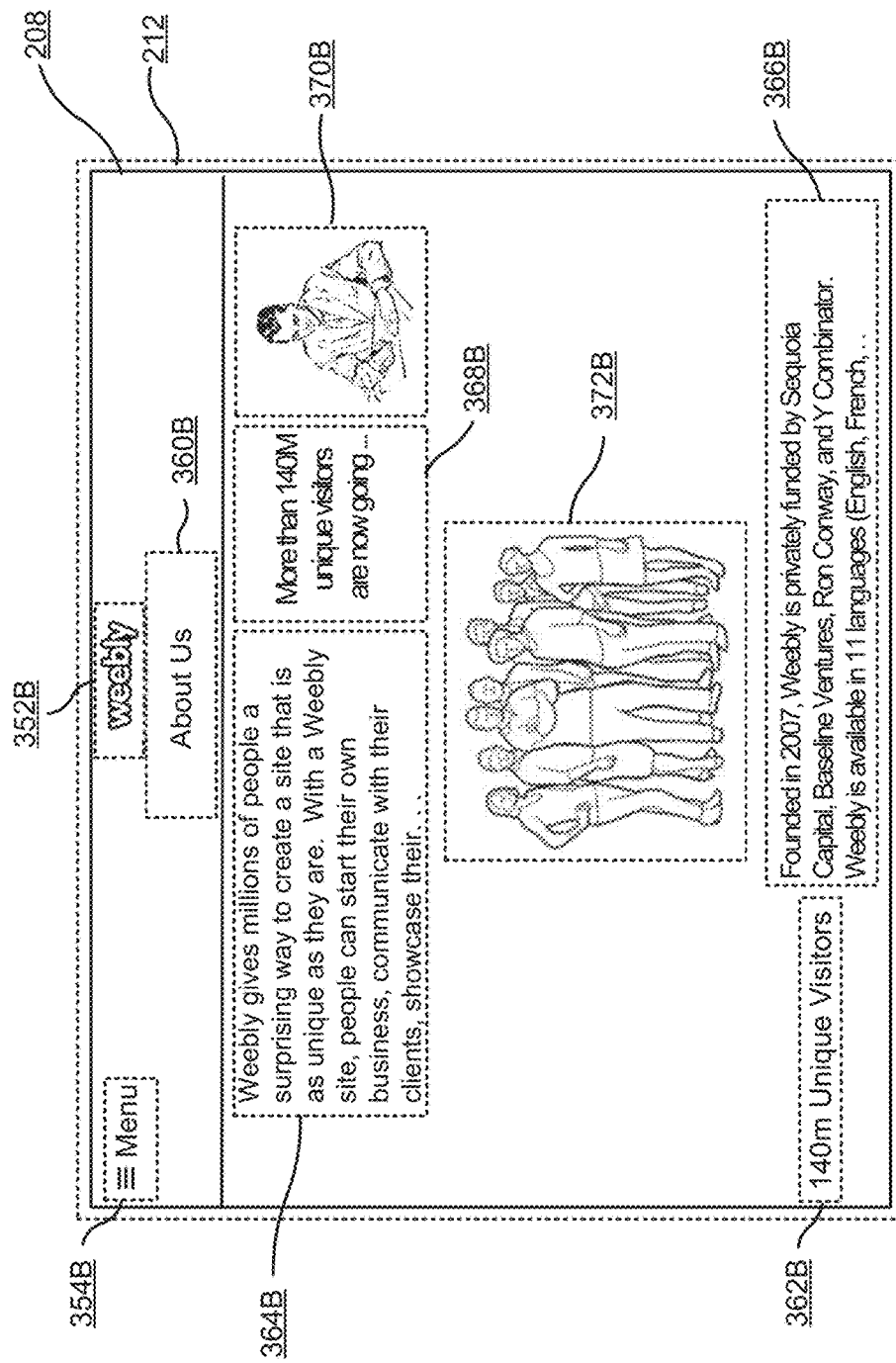

FIG. 3A is a flow chart illustrating a method 300 of editing web content, in accordance with an embodiment. Other embodiments may perform the steps of the method in different orders or may perform additional or fewer steps. FIGS. 3B-3D illustrate an example of a rendered web page 208 and a corresponding native overlay 212 as displayed on a display with portrait orientation, in accordance with an embodiment. FIG. 3E illustrates an example of the rendered web page 208 and the corresponding native overlay 212 as displayed on a display with a landscape orientation, in accordance with an embodiment. For ease of discussion, the method 300 illustrated in FIG. 3A will be described below in conjunction with the example rendered web page 208 and native overlay 212 shown in FIGS. 3B-3E.

When the user begins editing web content using the web editing application 126, the web editing application 126 sends a request for the web content to the web editing server 110. The requested web content may include a template 114 (if the user wishes to create a new web page) or a web page from the web page store 112 (if the user wishes to edit an existing web page). As described above with reference to FIG. 1, a web page is any data item that can be rendered to generate a page of content with one or more visual elements. The web page may include structured data (e.g., JSON), markup language (e.g., HTML), or some combination of the two. The web editing application 126 may also request multiple web pages and templates 114 at once. For example, the application 126 may request every page of a web site and templates 114 for creating pages with a similar formatting and layout as the existing pages of the web site.

In response to the request, web editing server 110 sends 302 initialization data to the web editing application 126. The initialization data includes the requested web page(s) or template(s) 114, which is stored as web page(s) 202 in the web editing application 126. The initialization data also includes the theme content and a page hierarchy associated with the requested web page(s) or template(s) 114. The theme content and page hierarchy may be stored in association with the web page(s) 202 in the web editing application 126.

In addition to requesting the web content, the web editing application 126 also detects 303 display information of the client device 120. Display information identifies characteristics of a display of the client device 120. For example, the orientation of the display (e.g., landscape or portrait), the dimensions of the display, or the resolution of the display. Display information is used to render web pages and native overlays that are appropriate for the client device 120. Display information may also be detected 303 upon a change to the display, such as a rotation of the display from landscape to portrait orientation.

The web editing application 126 generates 304 toolbars containing options that allow the user to edit the web page 202. Although the steps of detecting 303 display characteristics and generating 304 the toolbars is illustrated in FIG. 3 as occurring after the web editing application 126 receives 302 the initialization data, steps 303, 304 are independent of step 302. Therefore, web editing application 126 may alternatively detect 303 display characteristics and generate 304 the toolbars before requesting and receiving 302 the initialization data, or the steps 302, 303, 304 may be performed concurrently.

After receiving the initialization data, the web editing application 126 sends 306 an instruction to the web rendering module 124 to render the web page 202. In response, the web rendering module 124 renders 308 the web page 202 and displays the rendered web page 208 on the client device 120. In an embodiment where the web page 202 is stored as structured data (e.g., JSON), the structured data interpreter 252 transforms the structured data into markup language (e.g., HTML) describing the rendered web page 208, and the web rendering module 254 uses the markup language to generate and display the rendered web page 208. An example rendered web page 208 is shown in FIG. 3B. The example rendered web page 208 includes a plurality of visual elements 352A through 372A. In the illustrated example, the visual elements include a logo 352A, links to access a menu 354A, a main heading 360A, a sub-heading 362A, body text 364A, 366A, 368A and images 370A, 372A.

Referring back to FIG. 3A, the web rendering module 124 also generates and sends 310 layout data 210 back to the web editing application 126. As described above, the layout data 210 describes the sizes and positions of the visual elements 352A through 372A on the rendered web page 208. For example, the layout data 210 may define the position of the upper-left corner, the horizontal dimension, and the vertical dimension of each visual element 352A through 372A.

The web editing application 126 uses the layout data 210 to generate 312 a native overlay 212. FIGS. 3C and 3D illustrate an example native overlay 212 for the rendered web page 208 shown in FIG. 3B. FIG. 3C is an exploded view that illustrates the native overlay 212 and the rendered web page 208 separately, and FIG. 3D illustrates the native overlay 212 displayed on top of the rendered web page 208. Although the visual elements 352A through 372A of the rendered web page 208 are shown in FIG. 3D, reference numerals for the visual elements are not shown in FIG. 3D for the sake of clarity. The native overlay 212 shown in FIGS. 3C and 3D includes a plurality of cells 352B through 372B, and each cell 352B through 372B has a position and size that matches the position and size of a respective visual element 352A through 372A on the rendered web page 208.

In one embodiment, the web editing application 126 detects a change to the display information of the client 120 (e.g., rotation of the display from portrait orientation to landscape orientation). In this embodiment, the method 300 may return to step 303 and proceed in rendering the web page and generating the native overlay with appropriate dimensions and cell positioning for the detected display characteristics. This process may be repeated several times as the web editing application 126 detects multiple changes to the display information.

FIG. 3E illustrates an example of the rendered web page 208 and the corresponding native overlay 212 as displayed on a display with a landscape orientation, in accordance with an embodiment. For several of the cells 352B through 372B (and the corresponding visual elements 352A through 372A), the position and size of the cells are different from the web page 208 as displayed on a display with portrait orientation (FIGS. 3C-3D). For example, cells 364B, 368B, and 370B constitute a row of cells when displayed in landscape orientation, but a column of cells when displayed in a portrait orientation. Similarly, cells 362B and 366B constitute a row of cells when displayed in landscape orientation, but a column of cells when displayed in a portrait orientation. Switching between columns and rows in this way allows items to be arranged on the web page 208 in a way that is optimized for the characteristics of the display. This creates a better user experience for editing, viewing, and interacting with the web page 208, by using the space on the display more efficiently. If the client device is a smaller device, such as a smartphone, using the display more efficiently may have a major impact on user experience, because users can see more content at once without having to scroll or zoom.

Referring back to FIG. 3D, in one embodiment, the web editing application 126 configures the native overlay 212 so that each cell 352B through 372B is transparent, and the web editing application 126 causes the native overlay 212 to be displayed on top of the rendered web page 208. As a result, the rendered web page 208 remains visible to the user under the native overlay 212, but each visual element 352A through 372A on the rendered web page 208 is aligned with a cell 352B through 372B on the native overlay 212. FIG. 3D illustrates an example of how the cells 352B through 372B align with the visual elements 352A through 372A in this manner.

Because the native overlay 212 is displayed on top of the rendered web page 208, the native overlay 212 captures any gestures or other interactions that the user performs. Thus, when the user attempts to interact with a visual element on the rendered web page 208, the user actually performs an interaction with a cell in the native overlay 212 that has the same position and size as the visual element.

Referring back to FIG. 3A, in one embodiment the web editing application 126 sends instructions to a layout generation module in the operating system 122 (e.g., by creating an instance of the UICollectionView class in APPLE IOS) to generate 312 and display the native overlay 212 on the client device 120. For example, the instructions may define the position and size of each cell 352B through 372B in the native overlay 212 and an indication that each cell 352B through 372B is transparent.

The web editing application 126 receives 314 a user interaction with the native overlay 212 or one of the toolbars and makes a corresponding change to the web page 202. Examples of user interactions and the corresponding changes are described below with reference to FIGS. 4A, 5A, and 6A. The web editing application 126 sends 316 the change to the web rendering module 124, and the web rendering module 124 renders 318 the updated rendered web page 208 for display on the client device 120. The web rendering module 124 also sends 320 updated layout data 210 for the updated rendered web page 208 back to the web editing application 126.

After receiving the updated layout data 210, the web editing application regenerates 322 the native overlay 212 using the updated layout data 210 so that the cells of the native overlay 212 match the visual elements of the updated rendered web page 208. In one embodiment, the web editing application 126 first compares the updated layout data 210 to the previous layout data and only regenerates 322 the native overlay 212 if the updated layout data 210 is different (i.e., if the updated layout data indicates that the user interaction changed the layout of the rendered web page 208). In another embodiment, the web editing application 126 regenerates 322 the native overlay 212 using the updated layout data 210 without first comparing the updated layout data 210 to the previous layout data.

At any point after the web editing application 126 updates the web page 202 based on the user's interaction, the web editing application 126 may send 324 the updated web page 202 to the request fulfillment module 116 of the web editing server 110 to be saved in the web page store 112. In one embodiment, only changes to the web page 202 are sent to the web editing server 110. Step 324 may be performed automatically without receiving a separate user input to save the web page 202 to the web page store 112. For example, if only changes are sent to the web editing server 110, step 324 may be performed each time a change is made to the web page. In one embodiment, the web editing application 126 implements a queuing system to send multiple updates to the request fulfillment module 116 in series after the updates are made on the client device 120. A queuing system can be advantageous in situations where the client device 120 does not have continuous access to the web editing server 110 over the network 101 and is unable to save each edit immediately after the edit is made.

Method for Moving a Visual Element

Figure 4A:
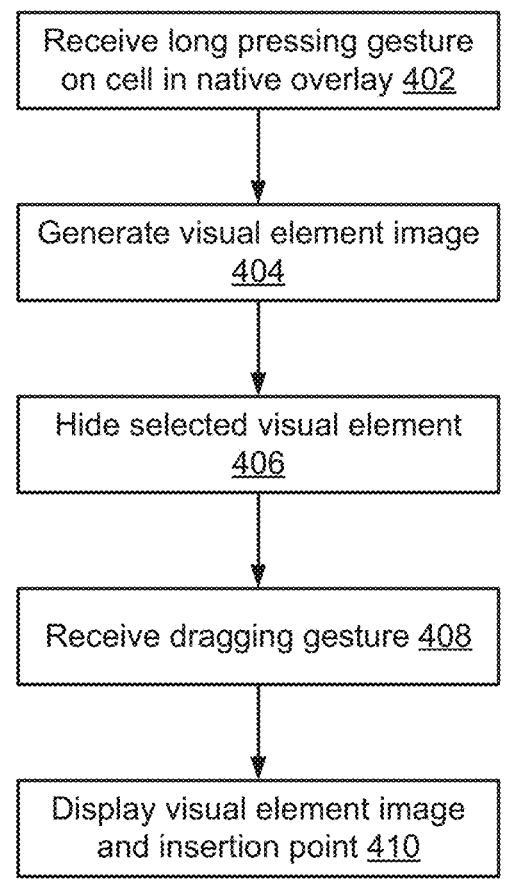
FIG. 4A is a flow chart illustrating a method of interacting with a native overlay to move a visual element on a web page, in accordance with an embodiment.
Figure 4B:
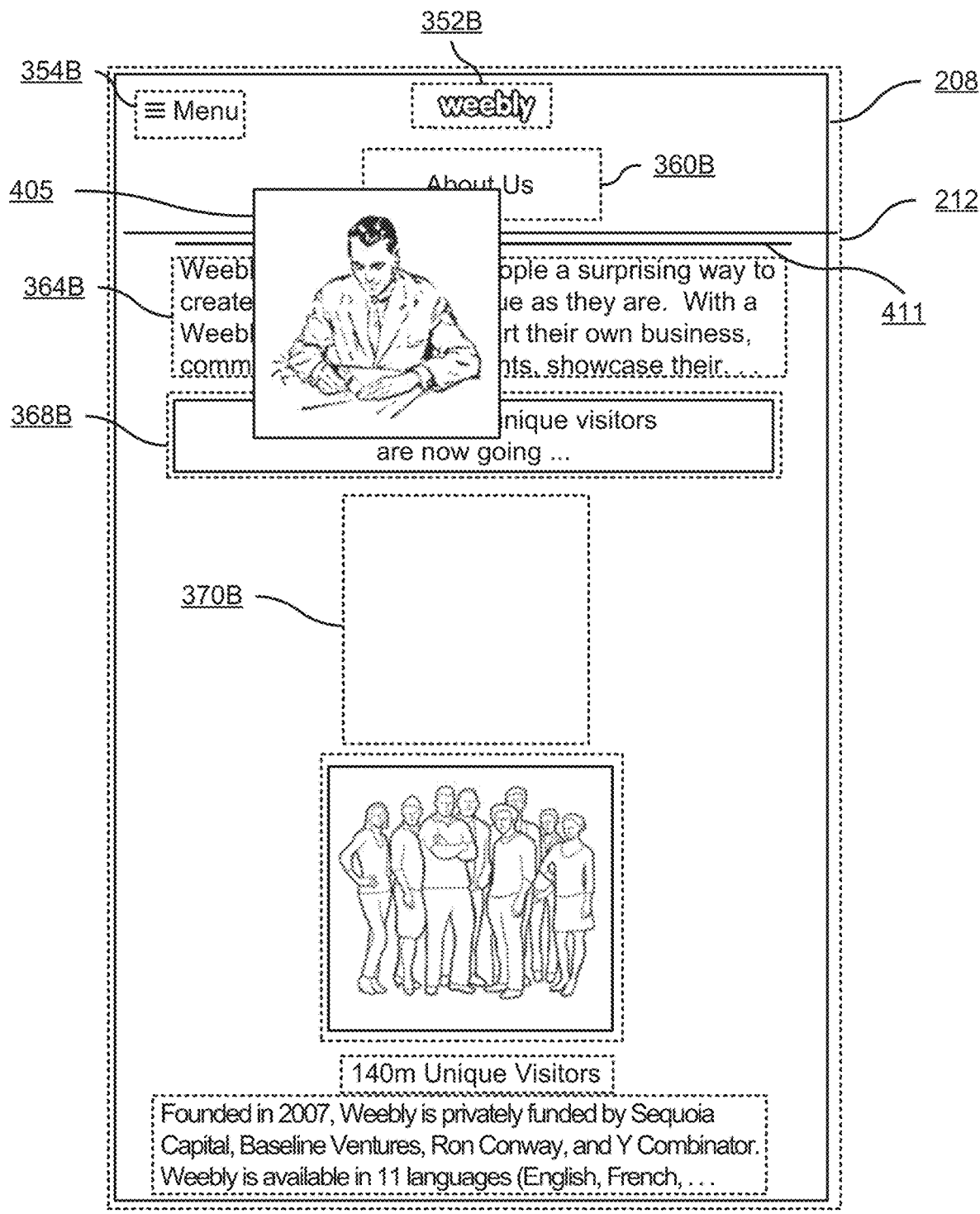
FIG. 4B illustrates an example of a visual element being moved, in accordance with an embodiment.
Figure 4C:
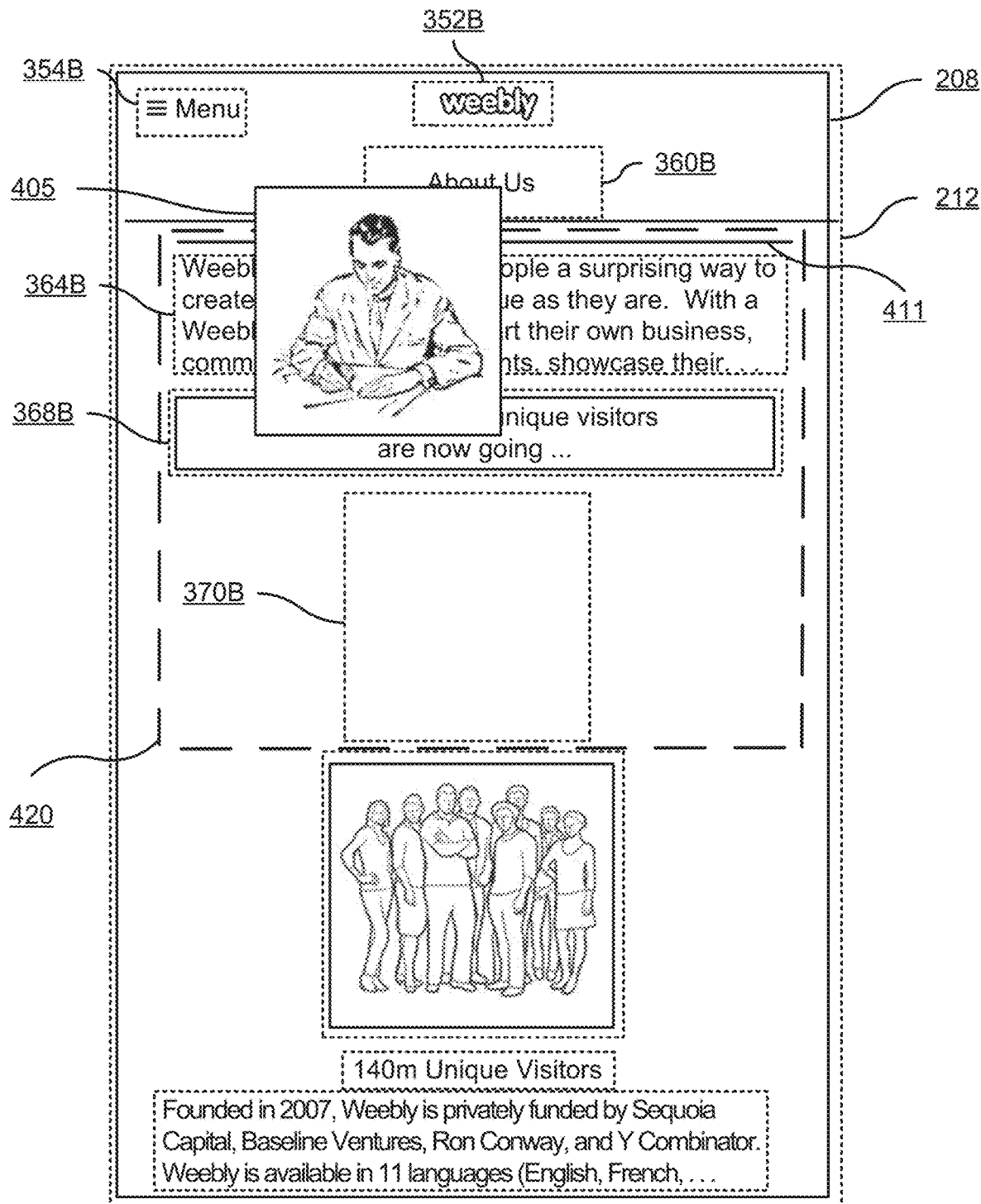
FIG. 4C illustrates an example of a visual element being moved, in accordance with another embodiment.

FIG. 4A is a flow chart illustrating a method 314A of interacting with a native overlay 212 to move a visual element on a web page, in accordance with an embodiment. Other embodiments may perform the steps of the method 314A in different orders or may perform additional or fewer steps. FIG. 4B illustrates an example of a visual element being moved, in accordance with an embodiment. FIG. 4C illustrates an example of a visual element being moved, in accordance with another embodiment. For the sake of clarity, reference numerals for the visual elements 352A through 372A of the rendered web page 208 are not shown in FIGS. 4B-4C. Similarly, reference numerals for the cells that are not explicitly referenced in the description below (i.e., cells 352B through 358B, 362B, 366B, 368B, and 372B) also are not shown in FIGS. 4B-4C. For ease of discussion, the method 314A of FIG. 4A will be described in conjunction with the example illustrated in FIG. 4B.

The method 314A begins when the user performs a long pressing gesture on a visual element within the rendered web page 208. Because the native overlay 212 is displayed on top of the rendered web page 208, the interaction processing module 214 receives 402 the long pressing gesture on the corresponding cell in the native overlay 212. For example, if the user performs a long pressing gesture on the image element 370A shown in FIG. 3B, the interaction processing module 214 receives a long pressing gesture on the corresponding cell 366B shown in FIGS. 3D and 4B. In one embodiment, the interaction processing module 214 receives an identifier for the cell that was pressed. In another embodiment, the interaction processing module 214 receives an indication that a long pressing gesture was detected at a particular position on the display and uses the layout data 210 to identify the cell that was pressed.

The interaction processing module 214 uses the layout data 210 to generate 404 an image of the selected visual element (the visual element image). In one embodiment, the interaction processing module 214 accesses the layout data 210 to obtain the position and dimensions of the cell corresponding to the selected visual element and captures a screenshot of the region of the rendered web page 208 defined by the position and dimensions. In another embodiment, the interaction processing module 214 captures a screenshot image of the entire rendered web page 208 and uses the layout data 210 to crop the screenshot image to remove everything other than the visual element. For example, if the layout data 210 defines the top-left corner and the dimensions of the visual element, the interaction processing module 214 uses these two data items to determine the four corners of the visual element and crops the screenshot image to remove portions of the screenshot image that does not fall within those four corners.

The interaction processing module 214 also hides 406 the visual element so that the visual element is not displayed twice on the screen when the user performs a dragging gesture. In one embodiment, the interaction processing module 214 modifies the selected cell (which was previously transparent) so that the cell has an opaque color that matches the background color of the rendered web page 208. In the example shown in FIG. 4B, the cell 370B is modified in this manner to match the white background of the rendered web page 208. Alternatively, the module 214 may change the color of the selected cell to a default color (e.g., grey) or apply a pattern to the selected cell (e.g., grey stripes). The module 214 may also modify the appearance of the visual element image to add another visual cue that the visual element is being moved. For example, the module 214 may adjust the opacity of the visual element image.

To move the visual element, the user performs a dragging gesture to drag the visual element image from its initial position (i.e., a position within the selected cell) to a new position on the rendered web page 208. When the interaction processing module 214 receives 408 the dragging gesture, the module 214 displays 410 the visual element image at the new position. In one embodiment, the module 214 implements the display of the visual element image as a draggable image so that the visual element image appears to move with the user's finger as the user performs the dragging gesture. In the example shown in FIG. 4B, the user has performed a dragging gesture to drag the visual element image 405 from a position within the cell 370B to a position near the top of the rendered web page 208. As a result, the interaction processing module 214 displays the visual element image 405 near the top of the page 208.

The interaction processing module 214 also displays 410 an insertion point (e.g., the insertion point 411 in FIG. 4B). The insertion point represents the location at which the visual element will be inserted if the user terminates the dragging gesture (e.g., by lifting his or her finger) at the current position of the gesture. In one embodiment, the insertion point is a line that is drawn at the edge of a cell on the native overlay 212. In this embodiment, the interaction processing module 214 accesses the layout data 210 to determine the edge that is closest to the current position of the dragging gesture and displays the insertion point at the edge. In another embodiment, the insertion point is a line that is offset from the edge of a cell by a predetermined offset distance. Because the cells in the native overlay 212 align with the visual elements on the rendered web page 208, an insertion point that is displayed at or near the edge of a cell looks like it is displayed at the edge of a visual element. This has the effect of communicating the new location of the visual element being moved relative to the location of another visual element on the rendered web page 208. For example, the insertion point 413 in FIG. 4B is displayed near the top edge of the cell 364B corresponding to the body text element 364A, which indicates that the image element shown in the visual element image 405 will be placed in a location above the body text element 364A and below the main heading 260A (i.e., the element corresponding to the cell 360B).

In one embodiment, the interaction processing module 214 also displays a cell configuration indicator. The cell configuration indicator indicates whether the cells adjacent to the insertion point have a special arrangement that changes based on the display characteristics of the client device 120. For example, cells may constitute a column in a portrait orientation, but may constitute a row in landscape orientation. FIG. 4C illustrates an example of a visual element being moved, with an insertion point 411 and a cell configuration indicator 420 displayed, in accordance with one embodiment. The cells 364B, 368B, 370B are displayed as a column in portrait orientation, but are displayed as a row in landscape orientation (FIG. 3E). Accordingly, it is advantageous for a user to be aware that moving content within or into this column may cause it to be displayed as part of a row in a different display orientation. In one embodiment, there are two insertion points for the visual element image 405 above cell 364B. One insertion point 411, displayed in FIG. 4C, is within the cell configuration indicator 420. If the visual element is placed at insertion point 411, the cell corresponding to the visual element will be part of the row in landscape orientation. A second insertion point, not displayed in FIG. 4C, is outside of the cell configuration indicator 420. If the visual element is placed at the second insertion point, the cell corresponding to the visual element will not be part of the row in landscape orientation, and will instead be located above the row. In one embodiment, when the visual element image 405 is moved across the border of the cell configuration indicator 420 (e.g., from insertion point 411 within the cell configuration indicator to the second insertion point outside the cell configuration indicator), the cell configuration indicator is no longer displayed. This makes the user aware that the first insertion point will add the visual element to the special arrangement, while the second insertion point will not.

When the user terminates the dragging gesture, the interaction processing module 214 moves the visual element to a location on the web page 202 corresponding to the insertion point. For example, the interaction processing module 214 changes the web page 202 so that the visual element is displayed in the new location when the web page 202 is rendered. The interaction processing module 214 also sends 316 the change in the web page 202 to the web rendering module 124 in accordance with the method 300 described in FIG. 3.

Method for Editing a Visual Element

Figure 5A:
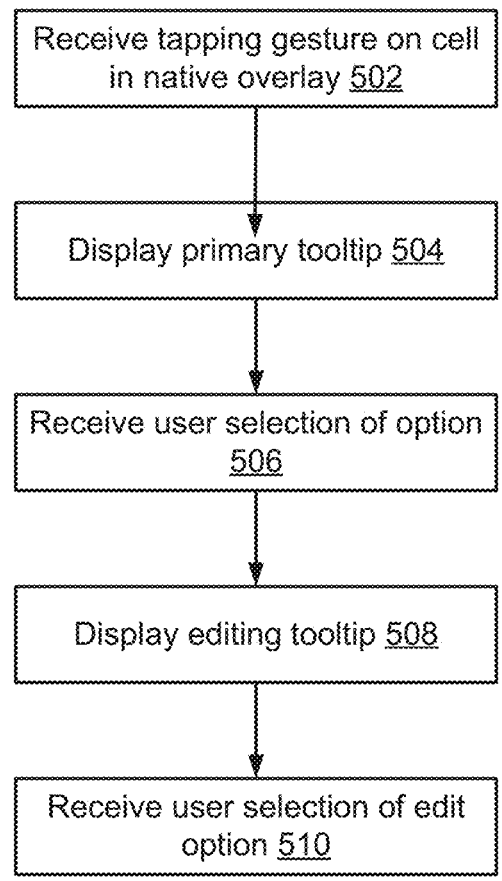
FIG. 5A is a flow chart illustrating a method of interacting with a native overlay to edit a visual element on a web page, in accordance with an embodiment.
Figure 5B:
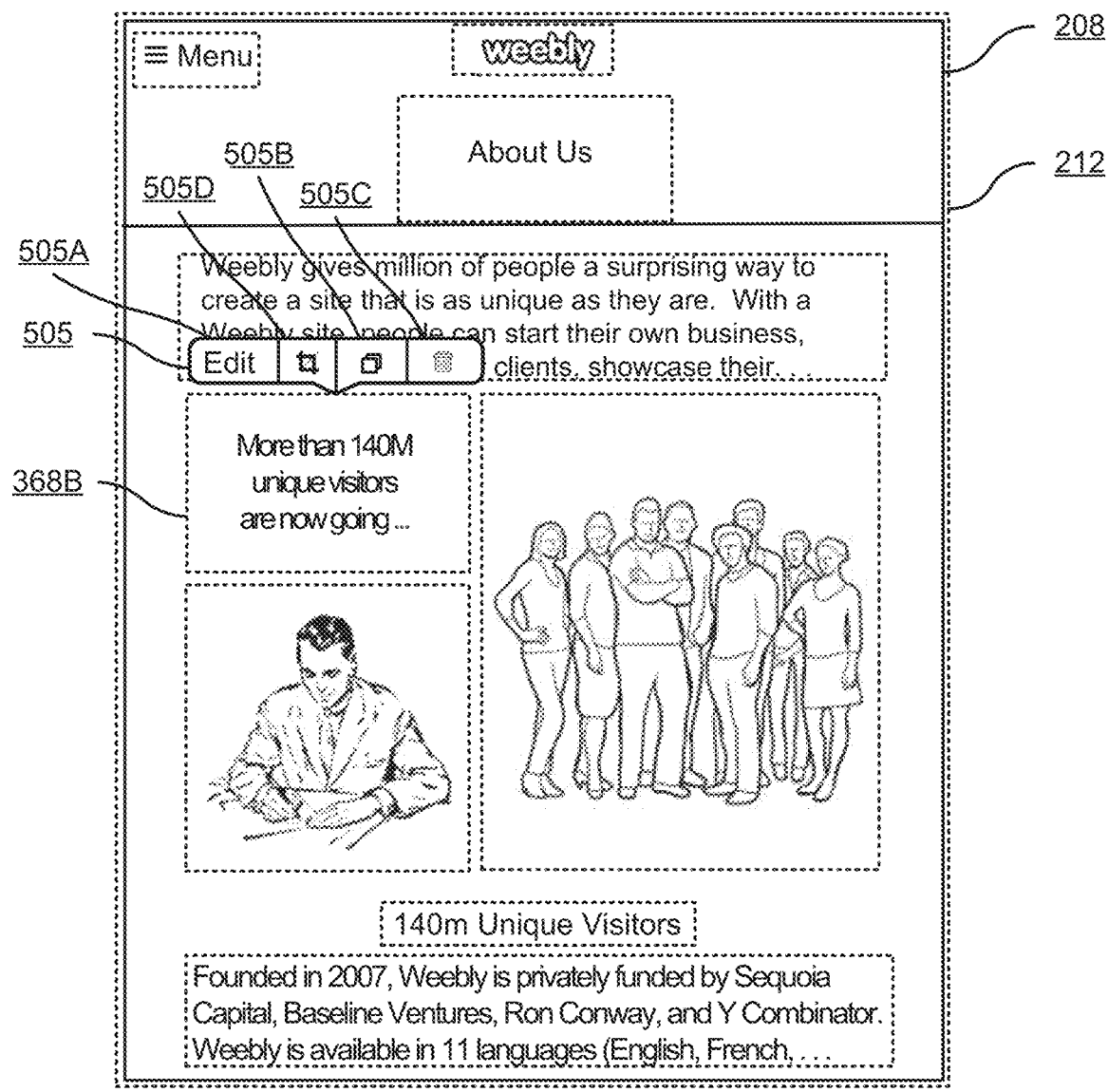
FIGS. 5B-5C illustrate an example of a visual element being edited, in accordance with an embodiment.
Figure 5C:
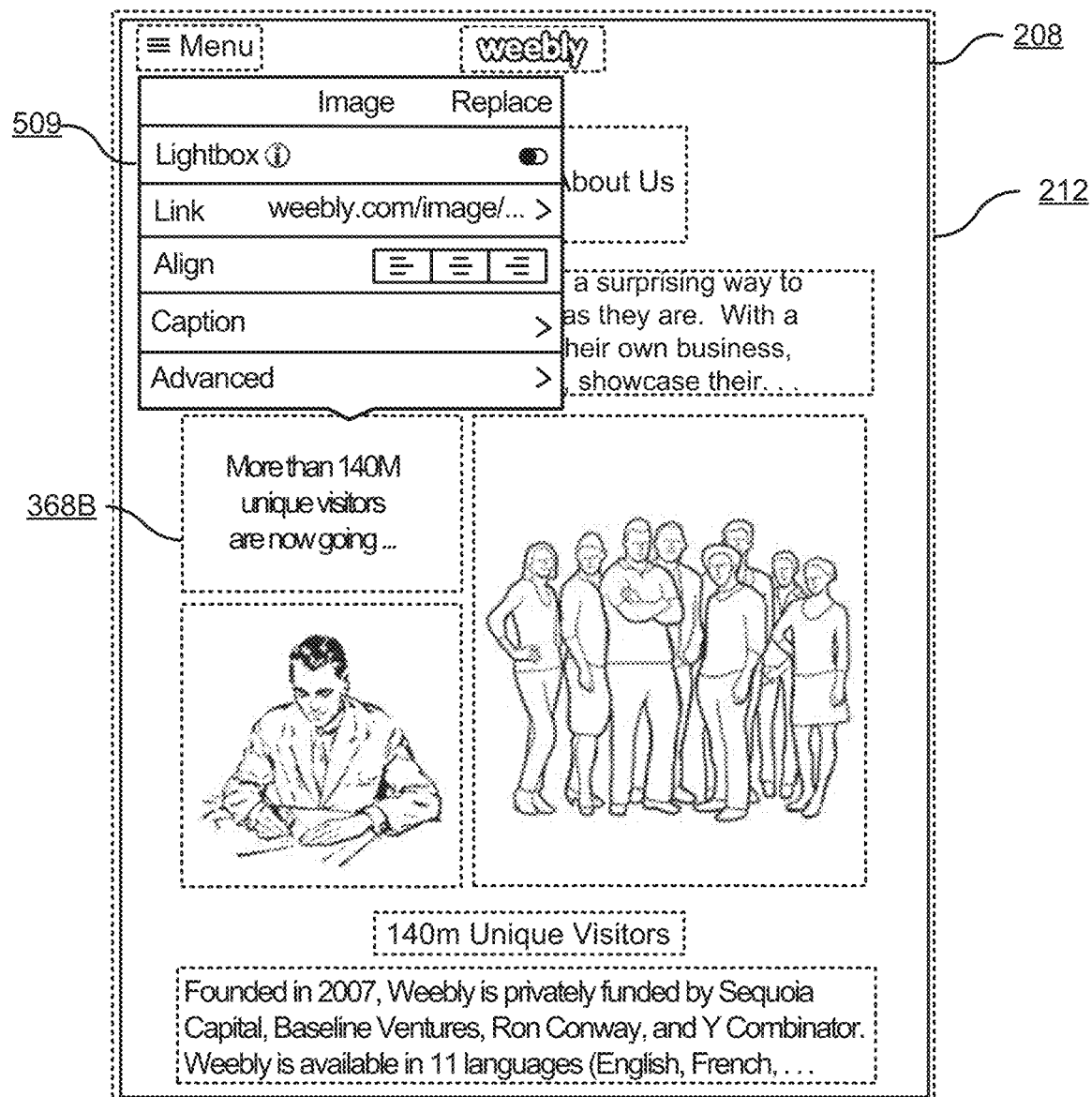

FIG. 5A is a flow chart illustrating a method 314B of interacting with a cell in the native overlay 212 to edit a visual element on a web page, in accordance with an embodiment. Other embodiments may perform the steps of the method 314B in different orders or may perform additional or fewer steps. FIGS. 5B-5C illustrate an example of a visual element being edited, in accordance with an embodiment. For the sake of clarity, reference numerals for the visual elements 352A through 372A of the rendered web page 208 are not shown in FIGS. 5B-5C. Similarly, reference numerals for the cells that are not explicitly referenced in the description below (i.e., cells 352B through 366B, 370B, and 372B) also are not shown in FIGS. 5B-5C. For ease of discussion, the method 314B of FIG. 5A will be described in conjunction with the example illustrated in FIGS. 5B-5C.

The method 314B begins when the user performs a tapping gesture on a visual element on the rendered web page 208. After the interaction processing module 214 receives 422 the tapping gesture on the corresponding cell in the native overlay 212, the module identifies the visual element by accessing the layout data 210. In the example shown in FIG. 5B, the user has performed a tapping gesture on the image element 368A. As a result, the interaction processing module 214 received 422 the tapping gesture on the cell 368B.

The interaction processing module 214 displays 424 a primary tooltip proximate to the cell. In one embodiment, the primary tooltip includes options to edit, move, and delete the visual element. An example of a primary tooltip 505 with these options 505A, 505B, 505C is illustrated in FIG. 5B. In some embodiments, the primary tooltip includes additional options that are only displayed for certain types of visual elements. For example, if the visual element is an image (as shown FIG. 5B) the primary tooltip may include an option 606D to crop the image. In one embodiment, the primary tooltip is displayed 424 inside the cell (and on top of the visual element). In another embodiment, the primary tooltip is displayed 424 at a position near the cell. For example, the primary tooltip may be displayed at a position above the cell (as shown in FIG. 5B) to prevent the tooltip from overlapping any portion of the visual element.

The user selects one of the options on the primary tooltip and the interaction processing module 214 receives 426 the user selection. If the user selects the delete option 505C, the module 214 changes the web page 202 to delete the visual element and the method 314C terminates. If the user selects the move option 505B, the module 214 performs steps 404 through 412 of the method 314A described with reference to FIG. 4A.

If the user selects the edit option 505A, the interaction processing module 214 displays 428 an editing tooltip that includes one or more options for making edits to the visual element. An editing tooltip 509 for the image element 368A is illustrated in FIG. 5C. The interaction processing module 214 determines the element type of the visual element being edited and selects the editing options in the editing tooltip 509 based on the element type. In one embodiment, the interaction processing module 214 determines the element type based on an identifier for the element that is associated with the cell or with the item of layout data corresponding to the cell. For example, if the module 214 determines that the visual element is an image, the edit options may include options to add a caption to the image and to provide a URL that opens when the image is selected (as shown in FIG. 5C). Meanwhile, if the visual element is a map, the edit options may include options to provide an address that is marked on the map and a default zoom level for the map. When the user selects one of the edit options, the interaction processing module 214 receives 430 the user selection and makes a corresponding change to the web page 202.

Method for Adding a Visual Element

Figure 6A:
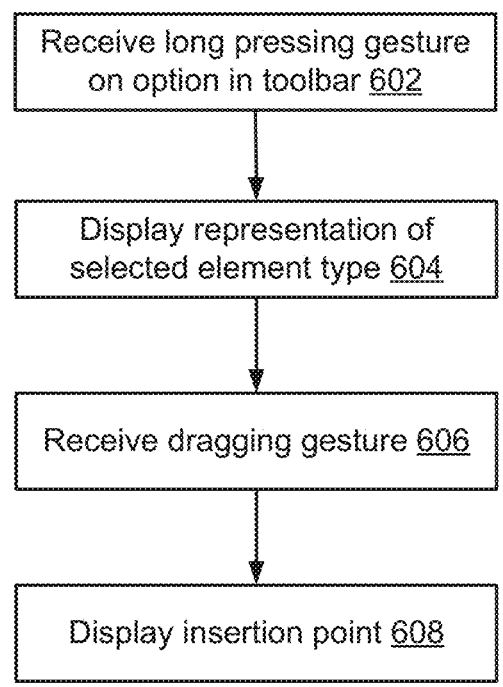
FIG. 6A is a flow chart illustrating a method of interacting with a native overlay to add a new visual element to a web page, in accordance with an embodiment.
Figure 6B:
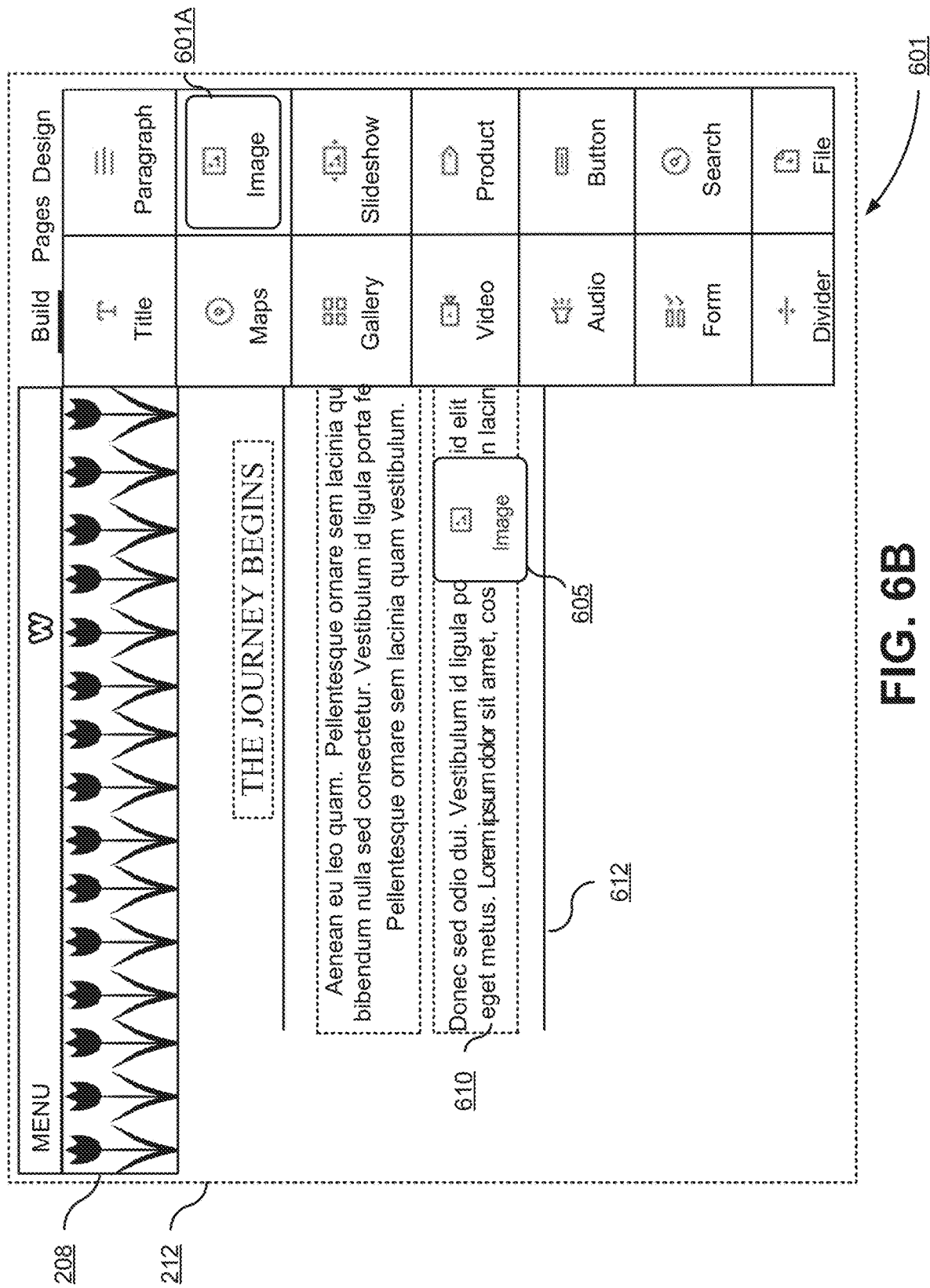
FIGS. 6B-6C illustrate an example of a visual element being added, in accordance with an embodiment.
Figure 6C:
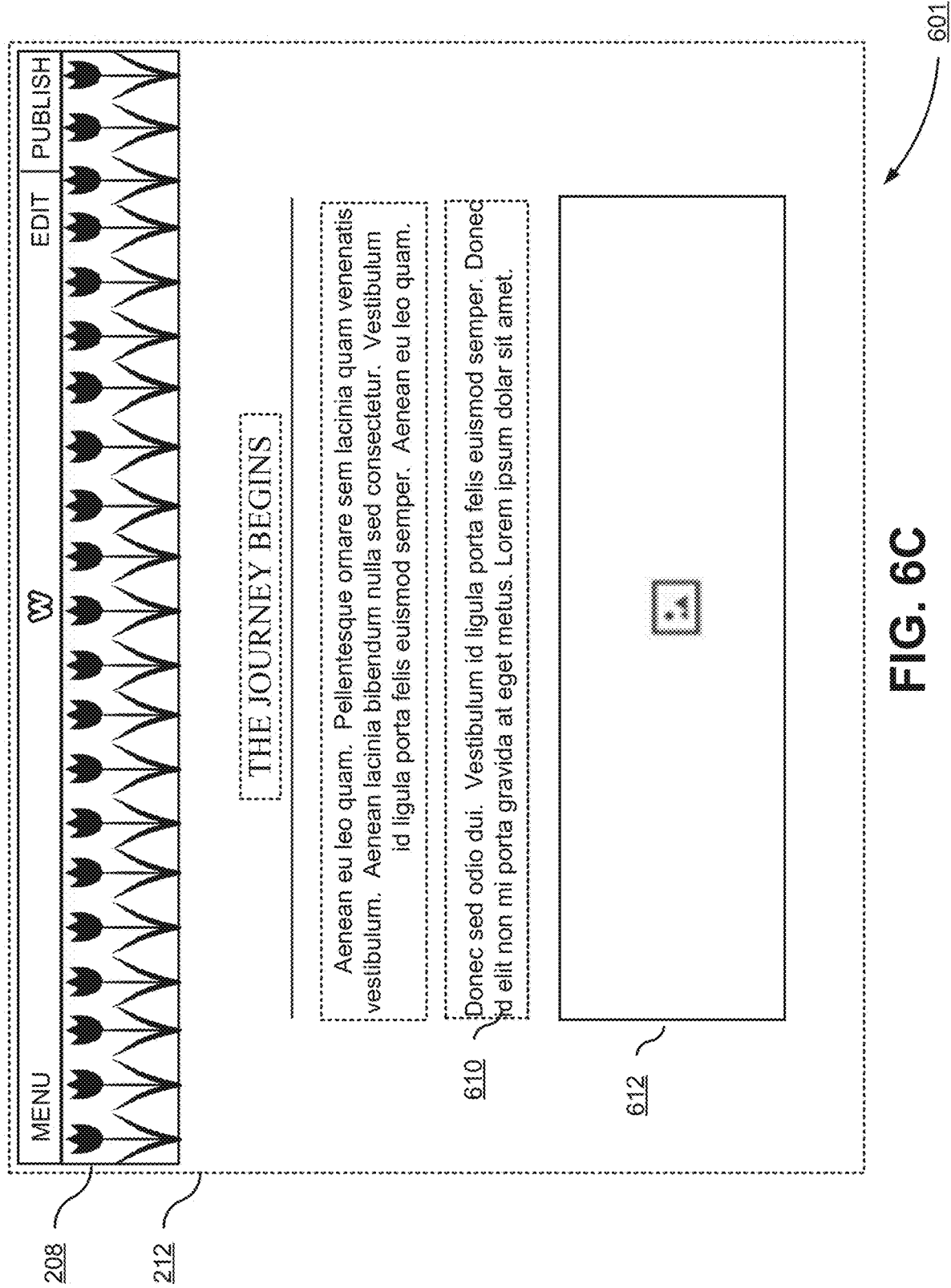

FIG. 6A is a flow chart illustrating a method 314C of interacting with cells in the native overlay 212 to add a new visual element to a web page, in accordance with an embodiment. Other embodiments may perform the steps of the method 314C in different orders or may perform additional or fewer steps. FIGS. 6B-6C illustrate an example of a visual element being added to a web page, in accordance with an embodiment. For the sake of clarity, reference numerals for visual elements of the rendered web page are not shown in FIGS. 5B-5C. Similarly, reference numerals for cells that are not explicitly referenced in the description below also are not shown in FIGS. 6B-6C. For ease of discussion, the method 314C of FIG. 6A will be described in conjunction with the example illustrated in FIGS. 6B-6C.

The method 314C begins when the user performs a long pressing gesture on an option in one of the toolbars to add a particular type of visual element to the web page 202. The interaction processing module 214 receives 602 the long pressing gesture and selects the element type corresponding to the option that was pressed. In the example shown in FIG. 6B, the user has performed a long pressing gesture on the image option 601A in the toolbar 601.

To indicate that the element type has been selected, the interaction processing module 214 displays 604 a representation of the selected element type. In one embodiment, the representation is a graphic of the selected element type. In the example shown in FIG. 6B, a graphic 605 for the image element that was selected includes an image icon and the word "Image" below the icon.

After the representation is displayed 604, the user performs a dragging gesture to drag the representation from the toolbar to a position on the rendered web page 208. The interaction processing module 214 receives 606 the dragging gesture and displays 608 an insertion point in the same manner as described above with reference to FIG. 4A. For example, if the user drags the representation 605 shown in FIG. 6B to a position near the bottom of the rendered web page 208, the module 214 displays 608 an insertion point 612 below the cell 610 corresponding to the second body text element on the page. Thus, the insertion point directs the user's attention to a location adjacent to a cell (and the corresponding visual element) and indicates to the user that a new visual element will be added at that location. When the user terminates the dragging gesture, the module 214 adds a visual element of the selected type to the location on the web page 202 corresponding to the insertion point. For example, FIG. 6C illustrates the web page after a new image element has been added below the second body text element.

The user interactions described in the methods 314A, 314B, 314C make reference to long pressing gestures and tapping gestures. The distinction between long pressing gestures and tapping gestures is merely meant to differentiate two types of input performed at the same position. In other embodiments, other types of input (e.g., using a pointing device to perform a left click or right click at the same position) may be used in place of the gestures referenced herein. In still other embodiments, the functions triggered by long pressing gestures and tapping gestures may be reversed.

The methods 300, 314A, 314B, 314C described with reference to FIGS. 3, 4A, 5A, and 6A advantageously allow the web editing application 126 to provide a responsive and interactive interface for editing web content. For example, the insertion point, which provides the user with a visual indication of the location where a visual element will be placed, is possible because the layout data 210 allows the interaction processing module 214 to determine the nearest edge of a visual element and display the insertion point at that edge. Similarly, the tooltips described in the method 314B have context-aware options that are selected based on the type of the visual element that is being edited. Selection of context-aware options is possible because the layout data 210 can be used to determine the type of the visual element corresponding to a cell when that cell is selected in the native overlay 212. Finally, the screenshot described in the method 314A can be rapidly cropped to exclude everything other than the visual element because the layout data 210 can be used to determine the corners of the visual element within the screenshot.

Figure 7A:
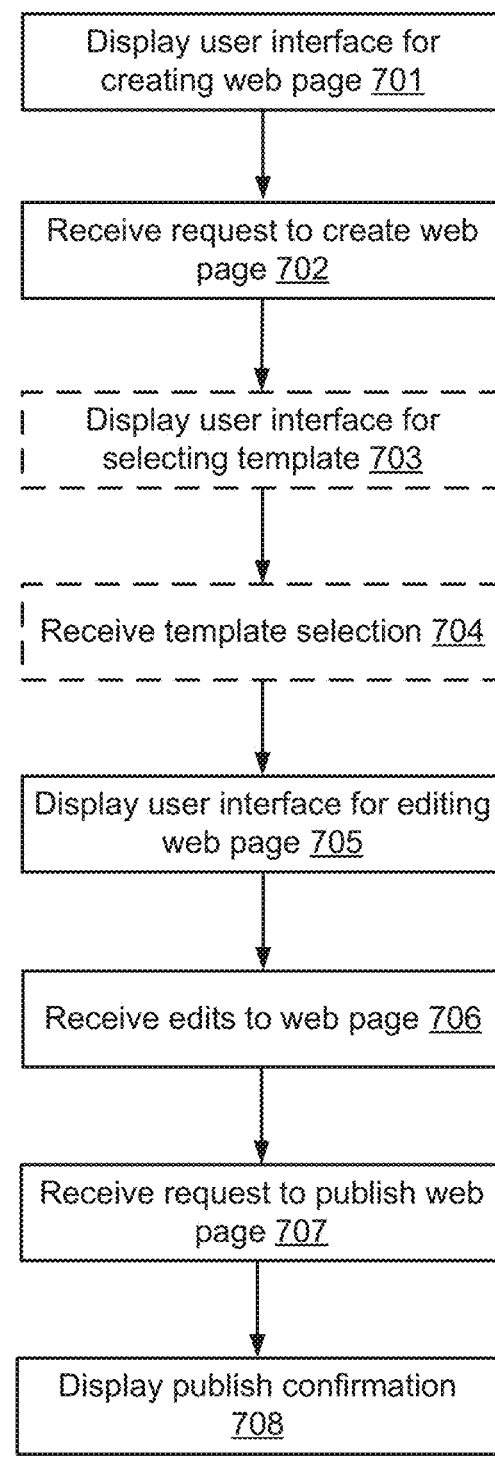
FIG. 7A is a flowchart illustrating a method for providing a user interface for creating, editing, and publishing a web page, in accordance with an embodiment.
Figure 7B:
FIG. 7B illustrates an example user interface for selecting a web page template, in accordance with an embodiment.
Figure 7C:
FIG. 7C illustrates an example user interface for previewing a web page as it is displayed on a client device, in accordance with one embodiment.
Figure 7D:
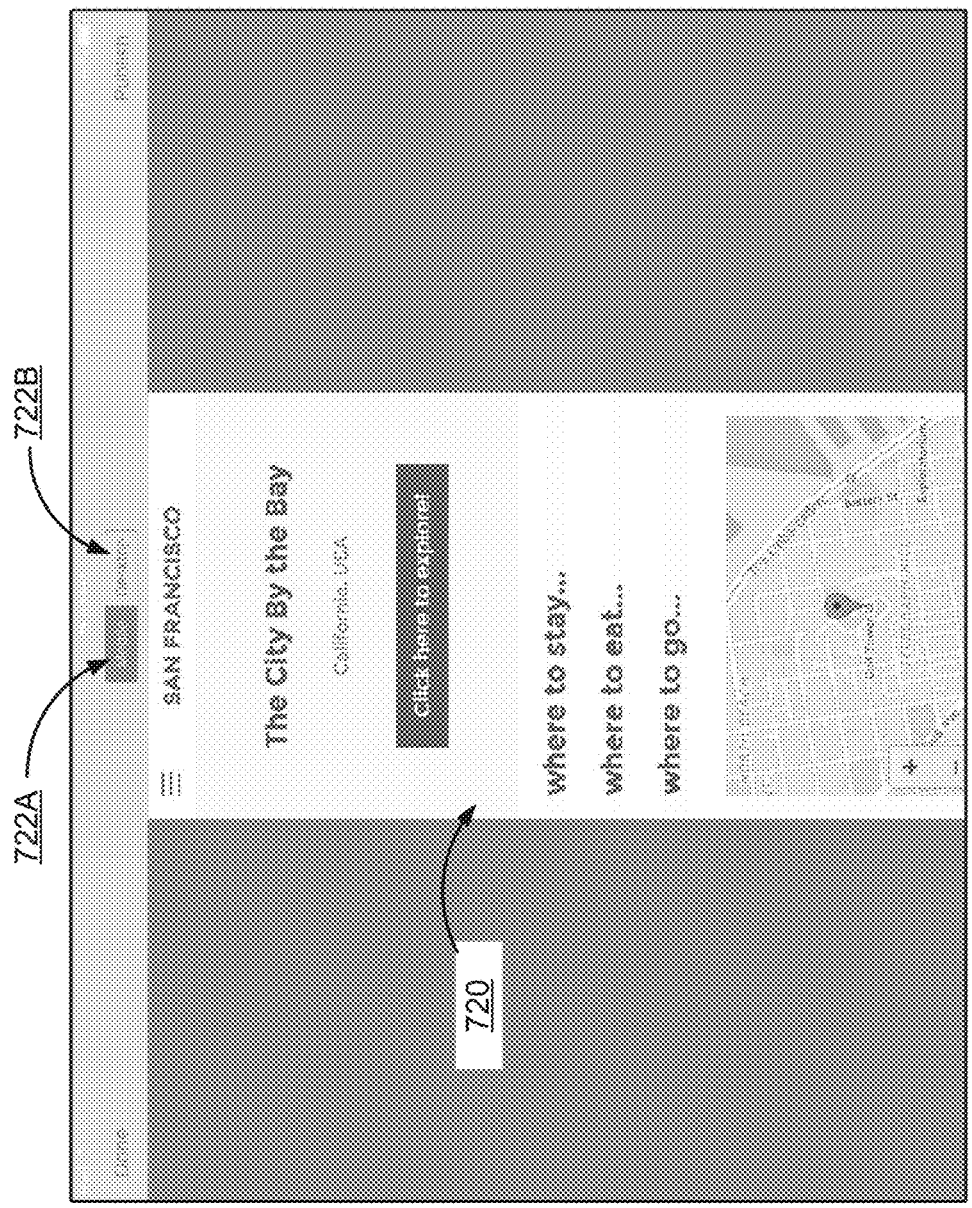
FIG. 7D illustrates an example user interface for previewing the web page as it is displayed on a mobile client device, in accordance with one embodiment.

FIG. 7A is a flowchart illustrating a method for providing a user interface on a mobile client device for creating, editing, and publishing a web page, in accordance with an embodiment. The web editing application 126 displays 701 a user interface for creating web pages and managing created web pages. The web editing application 126 receives 702 a request from a user to create a web page. The web editing application 126 then displays 703 a user interface for selecting a web page template. FIG. 7B illustrates an example user interface 710 for selecting a web page template, in accordance with an embodiment. Web template elements 714A through 714I are displayed in the user interface for user viewing and selection. Web template elements display a preview of available web templates. A user may select a web template element to select a web template. Templates may be organized according to styles (e.g., "Bold," "Corporate," "Fun," etc.). Users may select a particular style for viewing using the style elements 712A through 712J. The web editing application 126 receives 704 a template selection from the user. In one embodiment, steps 703, 704 are optional (as indicated by the dashed lines in FIG. 7A). The web editing application 126 may provide a default template or use a template associated with other web pages created by the user (e.g., other web pages that comprise a web site). In various embodiments, the user may return to the user interface of FIG. 7B during the web page creation process to select a different web template. The web editing application 126 displays 705 a user interface for editing a web page with the web page template, such as a user interface described with respect to FIGS. 4B, 4C, 5B, 5C, 6B, 6C. The web editing application 126 receives 706 edits to the web page, such as adding content, editing content, removing content, configuring the web page, etc. In one embodiment, the user interface includes a preview feature that allows the user to preview a finished version of a web page as it is displayed on a client device. FIG. 7C illustrates an example user interface for previewing a web page 720 as it is displayed on a client device, in accordance with one embodiment. FIG. 7D illustrates an example user interface for previewing the web page 720 as it is displayed on a mobile client device, in accordance with one embodiment. The user may switch between the user interfaces of FIGS. 7C and 7D using the selection elements 722A, 722B. The user interfaces of FIGS. 7C and 7D advantageously allow users to edit a web page on one device, but see how the web page will be presented on multiple types of client devices, such as desktop computers, tablets, smartwatches, smartphones, etc. This allows users to easily design web pages that are compatible with a variety of different client devices.

Once the user has edited the web page and is ready to publish the page, the user may send a request to publish the web page by selecting a publish element such as the publish button of FIG. 6C. The web editing application 126 receives 707 the request to publish the web page. The web editing application 126 then sends the web page to the web editing server 110 for publishing. Once the web page has been successfully published, the web editing application 126 displays 708 a publish confirmation to the user.

In one embodiment, various steps of the process 700 may be performed while the client device is not connected to the network 101. For example, steps 701-707 may be performed while the client device is not connected to web editing server 110 via the network 101, which allows a user of the device to edit the web page offline for later upload. In one embodiment, if the user requests to publish the web page while offline, the web application 126 will queue the publish request to send to the web editing server 110 once a connection is established. In another embodiment, if the user requests to publish the web page while offline, the web application 126 does not queue the publish request. In this embodiment, the web application 126 may notify the user that the web application cannot publish while the client device 120 is offline and may instruct the user to attempt to publish when the client device is online.

Physical Components of a Computer

FIG. 8 is a high-level block diagram of the components of a computing system 800 for use, for example, as the web-editing server 110 or the client device 120 shown in FIG. 1, in accordance with one embodiment. The computing system 800 includes at least one processor 802 coupled to a chipset 804. Also coupled to the chipset 804 are a memory 806, a storage device 808, a graphics adapter 812, input device(s) 814, and a network adapter 816. A display 818 is coupled to the graphics adapter 812. In one embodiment, the functionality of the chipset 804 is provided by a memory controller hub 820 and an input/output (I/O) controller hub 822. In another embodiment, the memory 806 is coupled directly to the processor 802 instead of the chipset 804.

The processor 802 is an electronic device capable of executing computer-readable instructions held in the memory 806. In addition to holding computer-readable instructions, the memory 806 also holds data accessed by the processor 802. The storage device 808 is a non-transitory computer-readable storage medium that also holds computer readable instructions and data. For example, the storage device 808 may be embodied as a solid-state memory device, a hard drive, compact disk read-only memory (CD-ROM), a digital versatile disc (DVD), or a BLU-RAY disc (BD). The input device(s) 814 may include a pointing device (e.g., a mouse or track ball), a keyboard, a touch-sensitive surface, a camera, a microphone, sensors (e.g., accelerometers), or any other devices typically used to input data into the computer 800. The graphics adapter 812 displays images and other information on the display 818. In some embodiments, the display 818 and an input device 814 are integrated into a single component (e.g., a touchscreen that includes a display and a touch-sensitive surface). The network adapter 816 couples the computing device 800 to a network, such as the network 101.

As is known in the art, a computer 800 can have additional, different, and/or other components than those shown in FIG. 8. In addition, the computer 800 can lack certain illustrated components. In one embodiment, a computer 800 acting as a server may lack input device(s) 814, a graphics adapter 812, and/or a display 818. Moreover, the storage device 808 can be local and/or remote from the computer 800. For example, the storage device 808 can be embodied within a storage area network (SAN) or as a cloud storage service.

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, computer program modules are stored on the storage device 808, loaded into the memory 806, and executed by the processor 802.

As used herein, a computer program product comprises one or more computer program modules that operate in conjunction to provide the functionality described herein. Thus, a computer program product may be stored on the storage device 808, loaded into the memory 806, and executed by the processor 802 to provide the functionality described herein.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The described embodiments also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the embodiments disclosed herein without departing from the spirit and scope as defined in the claims.

What is claimed is:

1. A method, implemented at least in part by a client computing device operable by a user to edit a web page comprising a plurality of visual elements, the method comprising:
   determining, in an editing state associated with editing the web page, that, when the web page is presented in a non-editing state, (i) a configuration of at least two first visual elements, of the plurality of visual elements, relative to each other, is based at least in part on a display characteristic associated with the client computing device and (ii) locations of the at least two first visual elements are based at least in part on the display characteristic;
   determining, in the editing state, that when the web page is presented in the non-editing state, a configuration of at least two second visual elements of the plurality of visual elements relative to each other is independent of the display characteristic;
   rendering, in the editing state, the web page via a user interface of the client computing device;
   determining, in the editing state, layout data describing locations for individual visual elements of the plurality of visual elements;
   generating, in the editing state, cells based at least in part on the layout data and the display characteristic associated with the client computing device, wherein each of the cells corresponds to a respective visual element of the plurality of visual elements, and the cells are interactable to enable editing of the web page;
   rendering, in the editing state, a cell configuration indicator to indicate that the configuration of the at least two first visual elements is based on the display characteristic associated with the client computing device;
   determining, in the editing state and based on an interaction with at least one cell of the cells, an edit to the web page, wherein the interaction with the at least one cell comprises a user gesture indicating movement of a selected visual element of the at least two second visual elements;
   displaying, in the editing state, a first insertion point inside the cell configuration indicator and a second insertion point outside of the cell configuration indicator;
   based on the user gesture indicating movement of the selected visual element to the first insertion point, adding the selected visual element as an additional first visual element and the configuration of the additional first visual element and the at least two first visual elements relative to each other is based at least in part on the display characteristic;
   based on the user gesture indicating movement of the selected visual element to the second insertion point, determining that the selected visual element is independent of the display characteristic; and
   updating, in the editing state, the web page based on the edit to the web page.

2. The method as claim 1 recites, wherein the display characteristic is an orientation of the client computing device.

3. The method as claim 2 recites, wherein the client computing device is determined to have a first orientation, and the method further comprises determining, in the editing state, the layout data based at least in part on the first orientation.

4. The method as claim 3 recites, further comprising:
   determining, in the editing state, that the client computing device has changed to a second orientation different than the first orientation;
   determining, in the editing state, updated layout data based at least in part on the second orientation;
   rendering, in the editing state, a new web page based at least in part on the updated layout data, wherein new web page comprises at least one visual element, of the at least two first visual elements, that is at least one of (i) in a different location or (ii) of a different size; and
   generating, in the editing state, new cells based at least in part on the new web page.

5. The method as claim 2 recites, further comprising:
   presenting, in the editing state and in association with one or more of the cells, an indicator in association with the at least two first visual elements to alert the user that the selected visual element will be presented in the configuration of the at least two first visual elements, relative to the at least two second visual elements, when the web page is presented in the non-editing state.

6. The method as claim 5 recites, further comprising displaying, in the editing state, prior to receiving the user gesture, and responsive to receiving an indication of a different user gesture, a tooltip associated with one or more options for enabling at least movement of the selected visual element, wherein the one or more options are determined based at least in part on a type of visual element.

7. The method as claim 1 recites, wherein the display characteristic is display information associated with the display of the client computing device, and the method further comprises rendering, in the editing state, the web page based at least in part on display information.

8. The method as claim 1 recites, further comprising determining the display characteristic in association with requesting web content associated with the web page from a web editing server.

9. The method as claim 1 recites, further comprising:
detecting, in the editing state, a change to an orientation of the client computing device; and
determining, in the editing state, the display characteristic responsive to detecting the change to the orientation of the client computing device.

10. The method as claim 1 recites, further comprising:
displaying, in the editing state, a plurality of web page templates via the user interface associated with the client computing device;
receiving, in the editing state, a selection of a web page template of the web page templates; and
rendering, in the editing state, the web page based at least in part on the selected web page template.

11. A device comprising:
one or more processors; and
one or more computer-executable instructions that, when executed by the one or more processors, cause the one or more processors to perform operations comprising:
determining, in an editing state associated with editing a web page comprising a plurality of visual elements, that, when the web page is presented in a non-editing state, (i) a configuration of at least two first visual elements, of the plurality of visual elements, relative to each other, is based at least in part on a display characteristic associated with the device and (ii) locations of the at least two first visual elements are based at least in part on the display characteristic;
determining, in the editing state, that when the web page is presented in the non-editing state, a configuration of at least two second visual elements of the plurality of visual elements relative to each other is independent of the display characteristic;
rendering, in the editing state and via a user interface presented on a display of the device, the web page comprising the plurality of visual elements;
determining, in the editing state, layout data describing locations for individual visual elements of the plurality of visual elements;
generating, in the editing state, one or more cells based at least in part on the layout data and the display characteristic associated with the device, wherein each cell of the one or more cells corresponds to a respective visual element of the plurality of visual elements, and the one or more cells are interactable to enable editing of the web page via the user interface;
rendering, in the editing state, a cell configuration indicator to indicate that the configuration of the at least two first visual elements is based on the display characteristic associated with the device;
determining, in the editing state and based on an interaction with the one or more cells, an edit to the web page, wherein the interaction with the one or more cells comprises a user gesture indicating movement of a selected visual element of the at least two second visual elements;
displaying, in the editing state, a first insertion point inside the cell configuration indicator and a second insertion point outside of the cell configuration indicator;
based on the user gesture indicating movement of the selected visual element to the first insertion point, adding the selected visual element as an additional first visual element and the configuration of the additional first visual element and the at least two first visual elements relative to each other is based at least in part on the display characteristic;
based on the user gesture indicating movement of the selected visual element to the second insertion point, determining that the selected visual element is independent of the display characteristic; and
updating, in the editing state, the web page based on the edit to the web page.

12. The device as claim 11 recites, wherein the display characteristic is an orientation of the device.

13. The device as claim 12 recites, wherein the device is determined to have a first orientation, and the operations further comprise determining, in the editing state, the layout data based at least in part on the first orientation.

14. The device as claim 13 recites, the operations further comprising:
determining, in the editing state, that the device has changed to a second orientation different than the first orientation;
determining, in the editing state, updated layout data based at least in part on the second orientation;
rendering, in the editing state, a new web page based at least in part on the updated layout data, wherein new web page comprises at least one first visual element of the at least two first visual elements, that is at least one of (i) in a different location or (ii) of a different size; and
generating, in the editing state, one or more new cells based at least in part on the new web page.

15. The device as claim 12 recites, the operations further comprise:
presenting, in the editing state and via the user interface, an indicator in association with the at least two first visual elements to alert a user that the selected visual element will be presented based in the configuration of the at least two first visual elements, relative to the at least two second visual elements, when the web page is presented in the non-editing state.

16. The device as claim 15 recites, the operations further comprising displaying, in the editing state, prior to receiving the user gesture and responsive to receiving an indication of a different user gesture, a tooltip associated with one or more options for enabling at least movement of the selected visual element, wherein the one or more options are determined based at least in part on a type of visual element.

17. The device as claim 11 recites, wherein the display characteristic is display information associated with the display of the device, and the operations further comprise rendering, in the editing state, the web page based at least in part on the display information.

18. The device as claim 11 recites, the operations further comprising determining the display characteristic in association with requesting web content associated with the web page from a web editing server.

19. The device as claim 11 recites, the operations further comprising detecting, in the editing state, a change to an orientation of the device and determining, in the editing state, the display characteristic responsive to detecting the change to the orientation of the device.

20. The device as claim 11 recites, the operations further comprising:
- displaying, in the editing state and via the user interface associated with the device, a plurality of web page templates;
- receiving, in the editing state, a selection of a web page template of the web page templates; and
- rendering, in the editing state, the web page based at least in part on the selected web page template.

\* \* \* \* \*